US006839303B2

(12) United States Patent
Handa et al.

(10) Patent No.: US 6,839,303 B2
(45) Date of Patent: Jan. 4, 2005

(54) MATCHED FILTER, RECEIVING BEAM-FORMING APPARATUS AND SONAR SYSTEM

(75) Inventors: Minoru Handa, Nishinomiya (JP); Hiroshi Iino, Nishinomiya (JP); Yasushi Nishimori, Nishinomiya (JP); Akira Okunishi, Nishinomiya (JP)

(73) Assignee: Furuno Electric Company, Limited, Hyogo-ken (JP)

(*) Notice: Subject to any disclaimer, the term of this patent is extended or adjusted under 35 U.S.C. 154(b) by 0 days.

(21) Appl. No.: 10/458,287

(22) Filed: Jun. 11, 2003

(65) Prior Publication Data

US 2004/0037166 A1 Feb. 26, 2004

Related U.S. Application Data

(62) Division of application No. 09/672,879, filed on Sep. 29, 2000.

(30) Foreign Application Priority Data

Sep. 29, 1999 (JP) .......................................... 11-276704

(51) Int. Cl.[7] ................................................ G01S 15/00

(52) U.S. Cl. ........................ 367/100; 367/119; 367/103

(58) Field of Search ................................ 367/100, 103, 367/119, 124; 600/447; 342/368

(56) References Cited

U.S. PATENT DOCUMENTS

| | | | | |
|---|---|---|---|---|
| 4,262,344 A | | 4/1981 | Gilmour | |
| 4,549,286 A | * | 10/1985 | Langeraar et al. | 367/103 |
| 4,679,176 A | * | 7/1987 | Ogawa et al. | 367/119 |
| 4,841,491 A | | 6/1989 | Kondo et al. | |
| 5,544,655 A | | 8/1996 | Daigle | |
| 5,667,373 A | | 9/1997 | Wright et al. | |
| 6,192,006 B1 | | 2/2001 | Iino et al. | |
| 6,310,832 B1 | | 10/2001 | Kits van Heyningen | |

FOREIGN PATENT DOCUMENTS

| | | |
|---|---|---|
| EP | 0368418 | 5/1990 |
| GB | 2029574 | 3/1980 |

* cited by examiner

*Primary Examiner*—Ian J. Lobo
(74) *Attorney, Agent, or Firm*—Birch, Stewart, Kolasch & Birch, LLP.

(57) ABSTRACT

A received beam-forming apparatus is disclosed is which echo signals received by multiple ultrasonic transducer elements arranged in a linear form are sampled at a specific scanning frequency to obtain sample data. A receiving beam-forming apparatus includes a memory which stores the sample data derived from multiple scanning cycles; and a beamformer which divides the multiple ultrasonic transducer elements into multiple blocks, reads out the sample data derived from different scanning cycles for the individual blocks from said memory, and forms a receiving beam in a specific direction using the individual sample data which have been read out. A sonar system using the receiving-beam forming apparatus is also disclosed as is a matched filter which selects an arc-shaped part of an ultrasonic transducer element array.

12 Claims, 24 Drawing Sheets

MATCHED FILTER, RECEIVING BEAM-FORMING APPARATUS AND SONAR SYSTEM

This application is a Divisional of application Ser. No. 09/672,879, filed Sep. 29, 2000.

BACKGROUND OF THE INVENTION AND RELATED ART STATEMENT

The present invention relates to a method for forming reception beams, an apparatus for forming reception beams and a matched filter for forming a reception beam from received short-pulse signals in a sonar or an ultrasonic diagnostic apparatus.

Apparatuses for forming reception beams by using a receiving array formed of a plurality of ultrasonic transducer elements have conventionally been available for practical use. These Apparatuses include, for example, a time-domain beamformer comprising delay circuits which are individually connected to the corresponding transducer elements, and a frequency-domain beamformer comprising phase-shift circuits which are individually connected to the corresponding transducer elements. Although it is possible to form a receiving beam suited for the reception of short-pulse signals by using the conventional apparatuses, these apparatuses are only used in limited systems including those for military applications that utilize relatively low frequencies, because the conventional beamforming apparatuses require a large-scale circuit configuration.

In sonar systems generally used in private sectors, on the other hand, it is practically impossible to provide delay circuits connected to individual transducer elements of an array due to limitations in physical size and product cost. Thus, the commercial sonar system sequentially samples signals received by the individual transducer elements at specific time intervals and forms a receiving beam by using sample data thus obtained. Since it is impossible to continuously monitor all the signals picked up by the individual transducer elements, the receiving beam is formed on the assumption that pulselength is long enough to ensure that a pulse of incoming ultrasonic waves would uniformly cover the entire receiving transducer array (or at least all the transducer elements that are used for forming the receiving beam). An analog phase shifter method, a complex discrete Fourier transform (DFT) method and a matched filter method are known examples of this type of beamforming.

In a system whose design is based on the assumption that a pulse of incoming ultrasonic waves would uniformly cover the entire receiving transducer array, however, beamforming performance would considerably deteriorate when the pulselength of a signal of incoming ultrasonic waves decreases and the incoming waves are not received simultaneously by the transducer elements used for forming the receiving beam.

In a bottom detecting sonar, on the other hand, it is necessary to shorten the pulselength of the incoming ultrasonic signals (return echoes) by shortening pulselength of a transmission signal to detect the sea bottom with high accuracy. In the commercial sonar systems and ultrasonic diagnostic apparatus, there is a growing tendency today to use shorter pulses or pulse compression by frequency modulation to achieve high resolution. Under these circumstances, the aforementioned conventional receiving beam-forming methods would pose problems related to performance deterioration.

There will be explained hereinafter How short-pulse waves arrive at a generally used receiving array referring to FIGS. 19 and 20.

FIG. 19 is a schematic diagram of a generally cylindrical receiving ultrasonic transducer array. The generally cylindrical shape of this receiving array has a radius of 125 mm with a sectorial portion of the cylindrical shape cut away, leaving a sectorial portion whose a central angle is 238.5°, for example. 160 transducer elements are arranged at 1.5° intervals on the 238.5° sectorial portion (1.5×159=238.5°). A receiving circuit for processing echo signals picked up by this receiving array forms a receiving beam using 60 transducer elements contained in about a 90° sector. The receiving array steers this receiving beam or, in other words, forms 101 receiving beams at 1.5° angular intervals, to scan a 150° sector area.

Provided that the frequency of return echoes is 320 kHz, the distance between the most frontal transducer elements (closest to the current beam direction) and the rearmost transducer elements simultaneously used for forming the receiving beam is equivalent to about 7.5 times the wavelength. If a return echo is a short-pulse signal having a carrier frequency whose pulselength is equal to 6 times the wavelength of the carrier, for example, the return echo can not be received at the same time by the 60 transducer elements contained in the 90° sector that are used for forming the receiving beam in the current beam direction as shown in FIG. 19.

FIG. 20 shows an example of a linear ultrasonic transducer array formed by arranging a plurality of transducer elements in a straight line. More specifically, 80 transducer elements are arranged at intervals equal to half the wavelength of the carrier included in incoming signals in this linear array. If waves of return echoes arrive from a direction almost perpendicular to the length of the array as illustrated by solid lines in FIG. 20, the return echoes can be simultaneously received by the entire array even when the return echoes are short-pulse signals having a carrier frequency whose pulselength is equal to 6 times the wavelength of the carrier, for example. If, however, the same short-pulse waves arrive at an incident angle of −60° as illustrated by broken lines in FIG. 20, only a limited number of transducer elements of the linear array can simultaneously receive the return echoes, resulting in a significant deterioration in beamforming performance, such as widening of beam angle and a decrease in sensitivity.

SUMMARY OF THE INVENTION

An object of the invention is to provide a receiving beam-forming method, a receiving beam-forming apparatus and a matched filter which can form a sharp, high-sensitivity beam for effectively receiving short-pulse incoming signals or nonuniform incoming waves which occur at leading or trailing edges of pulses.

In one aspect of the invention, a receiving beam-forming method comprises the steps of dividing a plurality of ultrasonic transducer elements arranged in an arc-shaped form into multiple blocks according to directions in which receiving beams are formed, repeatedly sampling signals received by the individual ultrasonic transducer elements at a specific scanning frequency, selecting sample data derived from different scanning cycles for the individual blocks, and forming the receiving beams using the selected sample data.

Here, the scanning cycle means a period during which the signals received by the aforementioned multiple ultrasonic transducer elements arranged in the arc-shaped form (or later-described ultrasonic transducer elements arranged in a linear form) are sampled once.

In this receiving beam-forming method of the invention, the signals received by the multiple ultrasonic transducer elements may be pulse signals whose pulselength is shorter than the extent of the multiple ultrasonic transducer elements arranged in the arc-shaped form as measured along the direction of each of the receiving beams.

In this receiving beam-forming method of the invention, the signals received by the multiple ultrasonic transducer elements may be either growing waves whose amplitude gradually increases or damped waves whose amplitude gradually decreases.

In another aspect of the invention, a receiving beam-forming method in which a plurality of ultrasonic transducer elements arranged in an arc-shaped form are obtained by selecting an arc-shaped part of multiple ultrasonic transducer elements which are arranged in a circular form, wherein receiving beam-forming direction is rotated by successively switching the selection of the arc-shaped part of the ultrasonic transducer elements.

In still another aspect of the invention, a receiving beam-forming method comprises the steps of dividing a plurality of ultrasonic transducer elements arranged in a linear form into multiple blocks, repeatedly sampling signals received by the individual ultrasonic transducer elements at a specific scanning frequency, selecting sample data derived from different scanning cycles for the individual blocks, and forming a receiving beam in a specific direction using the selected sample data.

In this receiving beam-forming method of the invention, the signals received by the multiple ultrasonic transducer elements may be pulse signals whose pulselength is shorter than the extent of the multiple ultrasonic transducer elements as viewed from the specific direction.

In this receiving beam-forming method of the invention, the signals received by the multiple ultrasonic transducer elements may be either growing waves whose amplitude gradually increases or damped waves whose amplitude gradually decreases.

In this receiving beam-forming method of the invention, selection of the scanning cycles for the individual blocks may be altered according to the angle between the direction of the receiving beam and the ultrasonic transducer elements arranged in the linear form.

In yet another aspect of the invention, a receiving beam-forming method comprises the steps of entering sample data obtained by sampling signals received by a plurality of ultrasonic transducer elements arranged in a linear form at a specific scanning frequency, storing the sample data derived from multiple scanning cycles, dividing the multiple ultrasonic transducer elements into multiple blocks, reading out the sample data derived from different scanning cycles for the individual blocks, producing a continuous sample data train by shifting the phase of the individual sample data, and forming a receiving beam in a specific direction using the sample data.

In a further aspect of the invention, a receiving beam-forming apparatus comprises a multiplexer which multiplexes echo signals received by multiple ultrasonic transducer elements arranged in an arc-shaped form on a receiving transducer into a smaller number of signal lines than the number of the ultrasonic transducer elements, an A/D converter which repeatedly samples the echo signals received by the individual ultrasonic transducer elements at a specific scanning frequency and outputs complex-valued sample data, and a signal processor which divides the multiple ultrasonic transducer elements into multiple blocks according to directions in which receiving beams are formed, selects the sample data derived from different scanning cycles for the individual blocks, and forms the receiving beams in the directions using the selected complex-valued sample data.

The receiving beam-forming apparatus of the invention may be such that the receiving transducer is constructed of multiple ultrasonic transducer elements arranged in a circular form, and the signal processor obtains the multiple ultrasonic transducer elements arranged in the arc-shaped form by selecting an arc-shaped part of the ultrasonic transducer elements arranged in the circular form and rotates receiving beam-forming direction by successively switching the selection of the arc-shaped part of the ultrasonic transducer elements.

In a further aspect of the invention, a matched filter which selects an arc-shaped part of ultrasonic transducer elements from a plurality of ultrasonic transducer elements arranged in a circular form and forms a receiving beam oriented in a central direction of the arc-shaped part comprises a shift register which has as many stages as a number given by (the number of the ultrasonic transducer elements arranged in the circular form)×(n−1)+(the number of the ultrasonic transducer elements of the arc-shaped part) and stores signal trains obtained from the ultrasonic transducer elements of the arc-shaped part among signal trains of multiple scanning cycles sequentially entered from the ultrasonic transducer elements arranged in the circular form in the order of a signal train of the nth scanning cycle, a signal train of the (n−1)th scanning cycle, . . . , a signal train of the second scanning cycle and a signal train of the first scanning cycle, a plurality of multipliers which divide the ultrasonic transducer elements of the arc-shaped part into n blocks according to the direction in which the receiving beam is formed, selects signals of the ultrasonic transducer elements of a block closest to the beam direction from the signal train of the nth scanning cycle, selects signals of the ultrasonic transducer elements of a block next to the block closest to the beam direction from the signal train of the (n−1)th scanning cycle, . . . , selects signals of the ultrasonic transducer elements of a block next to a block most distant from the beam direction from the signal train of the second scanning cycle, selects signals of the ultrasonic transducer elements of the block most distant from the beam direction from the signal train of the first scanning cycle, and multiplies the individual signals by corresponding coefficients, and an adder which adds up results of multiplications performed by the individual multipliers and outputs the sum as correlation data.

In another aspect of the invention, a matched filter selects an arc-shaped part of ultrasonic transducer elements from multiple ultrasonic transducer elements arranged in a partially cutaway circular form and forms a receiving beam oriented in a central direction of the arc-shaped part, wherein n number of shift registers having as many stages as the number of the multiple ultrasonic transducer elements arranged in the partially cutaway circular form and shift registers having as many stages as the number of the ultrasonic transducer elements of the arc-shaped part are connected in parallel, and the matched filter stores signal trains obtained from the ultrasonic transducer elements of the arc-shaped part among signal trains of multiple scanning cycles sequentially entered from the ultrasonic transducer elements arranged in the partially cutaway circular form in the order of a signal train of the nth scanning cycle, a signal train of the (n−1)th scanning cycle, . . . , a signal train of the second scanning cycle and a signal train of the first scanning cycle while loading them in parallel between the individual shift registers. This matched filter comprises a plurality of multipliers which divide the ultrasonic transducer elements of the arc-shaped part into n blocks according to the direction in which the receiving beam is formed, selects signals of the ultrasonic transducer elements of a block closest to the beam direction from the signal train of the nth scanning cycle, selects signals of the ultrasonic transducer elements of a block next to the block closest to the beam direction from the signal train of the (n−1)th scanning cycle, . . . , selects signals of the ultrasonic transducer elements of a block next to a block most distant from the beam direction from the signal train of the second scanning cycle, selects signals of the ultrasonic transducer elements of the block most distant from the beam direction from the signal train of the first scanning cycle, and multiplies the individual signals by corresponding coefficients, and an adder which adds up results of multiplications performed by the individual multipliers and outputs the sum as correlation data.

The matched filter of the invention may be such that the signal trains entered from the multiple ultrasonic transducer elements are complex-valued sample data trains, and the matched filter comprises two lines of the shift registers for in-phase data and quadrature data, four lines of the multipliers and the adder for in-phase data×in-phase coefficient, quadrature data×quadrature coefficient, in-phase data×quadrature coefficient, and quadrature data×in-phase coefficient, and an output section which determines an in-phase portion of a correlation value by subtracting the product of in-phase data×in-phase coefficient from the product of quadrature data×quadrature coefficient, and determines a quadrature portion of the correlation value by adding the product of in-phase data×quadrature coefficient and the product of quadrature data×in-phase coefficient.

The matched filter of the invention may provided with multiple sets of the coefficients such that the receiving beam can be focused at varying distances.

In another aspect of the invention, a receiving beam-forming device in which echo signals received by multiple ultrasonic transducer elements arranged in a linear form are sampled at a specific scanning frequency to obtain sample data comprises a memory which stores the sample data derived from multiple scanning cycles, and a beamformer which divides the multiple ultrasonic transducer elements into multiple blocks, reads out the sample data derived from different scanning cycles for the individual blocks from the memory, and forms a receiving beam in a specific direction using the individual sample data which have been read out.

In the receiving beam-forming device of the invention, selection of the scanning cycles for the individual blocks may be altered according to the angle between the direction of the receiving beam and the ultrasonic transducer elements arranged in the linear form.

In the receiving beam-forming device of the invention, the beamformer may be a matched filter which forms the receiving beam in the specific direction by multiplying the individual sample data by specific coefficients, wherein the matched filter is provided with multiple sets of the coefficients so that the receiving beam can be focused at varying distances.

In another aspect of the invention, a receiving beam-forming device in which echo signals received by multiple ultrasonic transducer elements arranged in a linear form are sampled at a specific scanning frequency to obtain sample data comprises a memory which stores the sample data derived from multiple scanning cycles, a sampling plane generator which produces a continuous sample data train of a sampling plane of a specific angle by shifting the phase of or interpolating the sample data derived from the multiple scanning cycles, and a beamformer which forms a receiving beam in a specific direction using the sample data.

In a further aspect of the invention, a receiving beam-forming device repeatedly samples echo signals received by multiple ultrasonic transducer elements at a specific scanning frequency and forms a receiving beam using sample data obtained by sampling the echo signals in multiple scanning cycles.

Since the invention makes it possible to form a receiving beam using the whole of ultrasonic transducer elements even when received signals are short-pulse waves, directivity and sensitivity of the receiving beam can be improved. When applied to a sonar system, the invention makes it possible to improve its range discrimination.

DETAILED DESCRIPTION OF THE PREFERRED EMBODIMENTS OF THE INVENTION

Principle of Operation

First, the principle of operation of the present invention will be explained referring to FIGS. 1 through 5.

Figure 1:
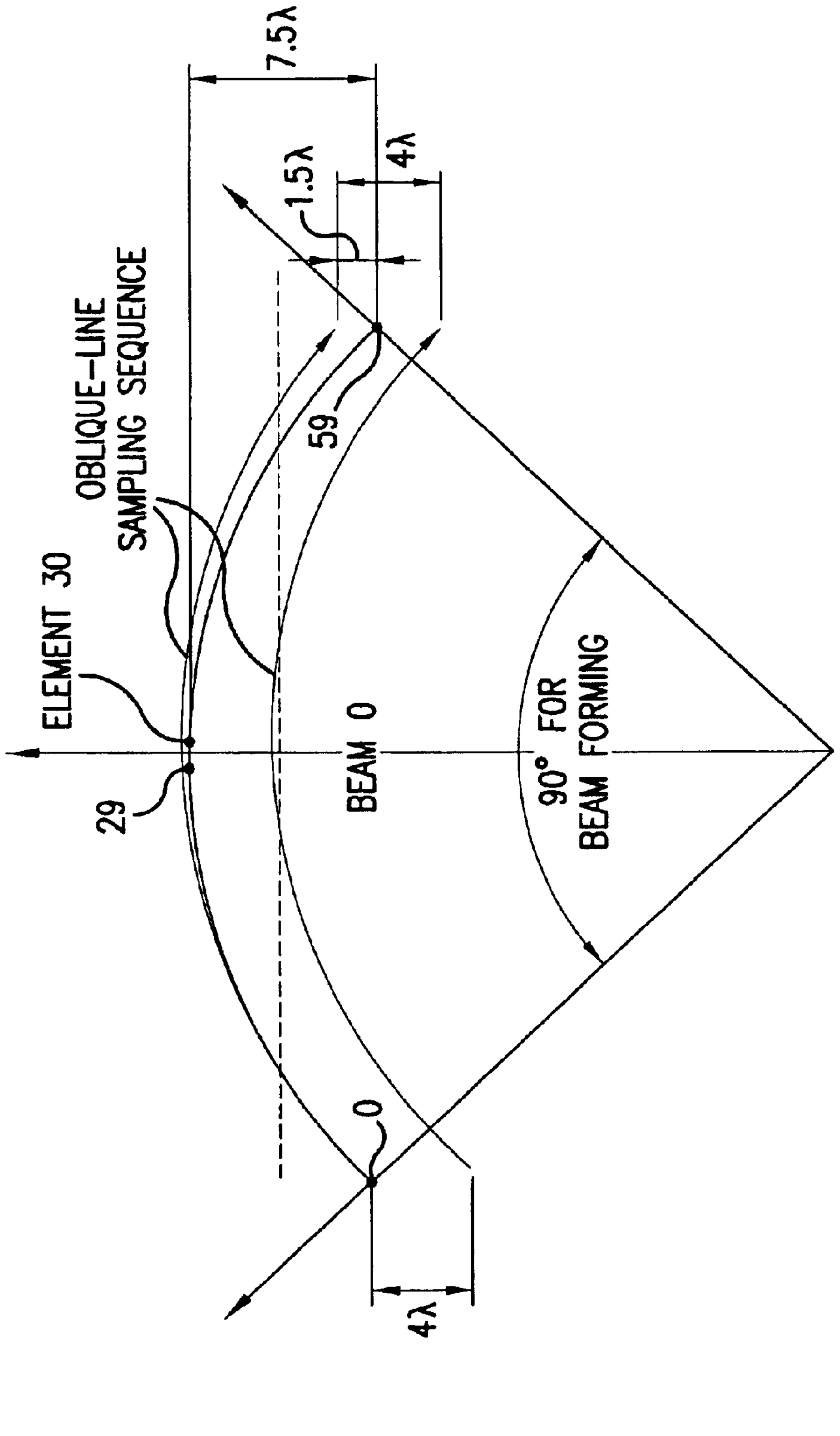
FIG. 1 is a diagram showing an example in which the present invention is applied to a case using signals received by a generally cylindrical ultrasonic transducer array.

FIG. 1 is a diagram showing part of a generally cylindrical receiving ultrasonic transducer array which is connected to a receiving circuit according to the present invention. Like the earlier-mentioned receiving array of the prior art, this receiving array has a radius of 125 mm with 160 ultrasonic transducer elements arranged at 1.5° intervals around the origin of the sector on its curved outer surface. The receiving circuit forms a receiving beam using 60 elements contained in an approximately 90° sector area at one time. More specifically, the receiving array successively forms 101 receiving beams, including a receiving beam 0 formed by using transducer elements 0–59 through to a receiving beam 100 formed by using transducer elements 100–159. In FIG. 1, the transducer elements 0–59 are used to form the receiving beam 0. The 101 receiving beams are successively formed in a clockwise direction, starting from the receiving beam 0. Designating the direction of each beam as 0° and assuming that the receiving beam 0 is currently formed, the transducer elements 29, 30 at the most frontal zone are located in ±0.75° directions, the transducer element 0 is located in a +44.25° direction, and the transducer element 59 is located in a −44.25° direction.

Provided that the frequency of incoming ultrasonic waves is 320 kHz and underwater sound velocity is 1500 m/s, the most frontal transducer elements 29, 30 and the rearmost transducer elements 0, 59 are separated by a distance equal to about 7.5 times the wavelength of the ultrasonic waves. Accordingly, when incoming waves from the beam direction just arrive at the rearmost transducer elements 0, 59, the incoming waves would have already passed the most frontal transducer elements 29 and 30 7.5 times the period of the incoming waves earlier, which corresponds to the time required for the incoming waves to travel the distance of 7.5 times the wavelength. Thus, to form a receiving beam from sample data sampled in specific scanning cycles with the period of the scanning cycles corresponding to four times the wavelength, for instance, the transducer elements located in a range of 7.5 times the wavelength in the beam direction are divided into two (front and rear) groups. More specifically, the transducer elements 0–59 are divided into rear group 1 (elements 0–8, 51–59) and front group 2 (elements 9–50) in the beam direction, and the receiving beam is formed by using sample data obtained from the transducer elements 0–8, 51–59 of the group 1 in a current scanning cycle as well as sample data obtained from the transducer elements 9–50 of the group 2 in a preceding scanning cycle. This approach makes it possible to form the receiving beam such that the incoming waves of a short-pulse signal with a pulselength equal to 6 times the wavelength would simultaneously hit the relevant transducer elements of the receiving array and thereby improve directivity and sensitivity of the receiving beam for the reception of short-pulse signals.

FIG. 1 shows a so-called oblique-line sampling scheme in which sampling operation is performed sequentially from element 0 to element 159. Since sampling time is delayed as the element number increases, optimum grouping of the transducer elements is to divide them into group 1 including elements 0–9, 53–59 and group 2 including elements 10–52.

Although the transducer elements are divided into two groups (two blocks) in FIG. 1, the number of groups is not limited to two but the transducer elements may be divided into a desired number n of groups where n is a positive integer. In the latter case, sample data derived from different scanning cycles should be selected.

Figure 2:
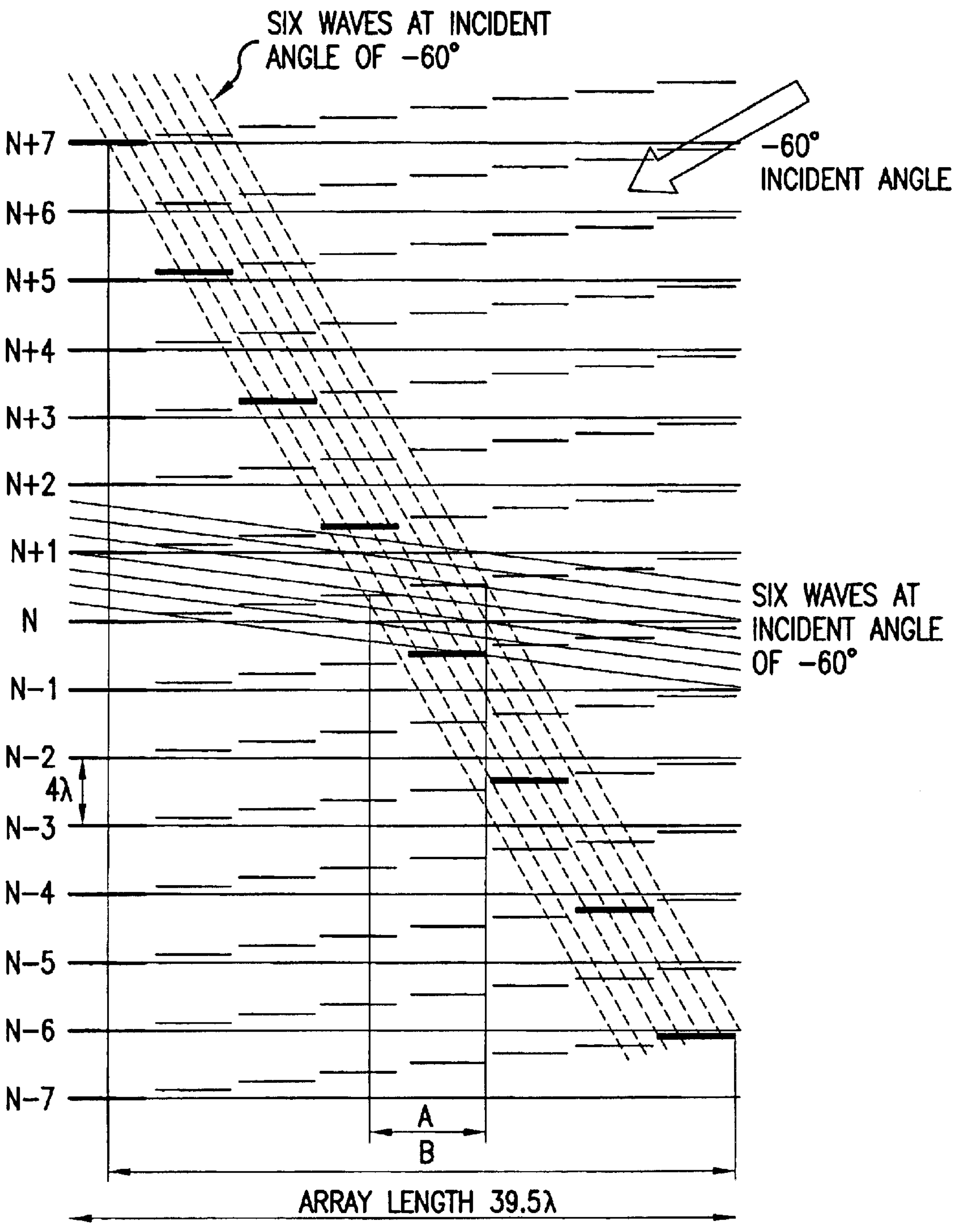
FIG. 2 is a diagram showing an example in which the invention is applied to a case using signals received by a linear ultrasonic transducer array.

FIG. 2 is a diagram showing a case in which the invention is applied to formation of a receiving beam by use of a linear array. Like the earlier-mentioned linear array of the prior art, this linear array includes 80 transducer elements which are arranged in a straight line at intervals equal to half the wavelength of incoming signals. FIG. 2 is a sampling time chart showing a case in which 15 scanning cycles (N−7 to N+7) of in-phase (I) and quadrature (Q) data sampling operation, each scanning cycle corresponding to four times the wavelength, are repetitively conducted using 10 transducer elements at a time from left to right of the linear array in a steplike form. While FIG. 2 illustrates incoming waves arriving from a −60° direction, the receiving beam is not formed by using sample data obtained from all the transducer elements in the same scanning cycle. Instead, the receiving beam is formed by using sample data shown by thick lines in FIG. 2 while shifting the scanning cycles of the successive 10 transducer elements. This approach makes it possible to increase the expanse of the transducer elements simultaneously hit by the incoming waves from A to B as illustrated and thereby improve beamforming performance.

Figure 3:
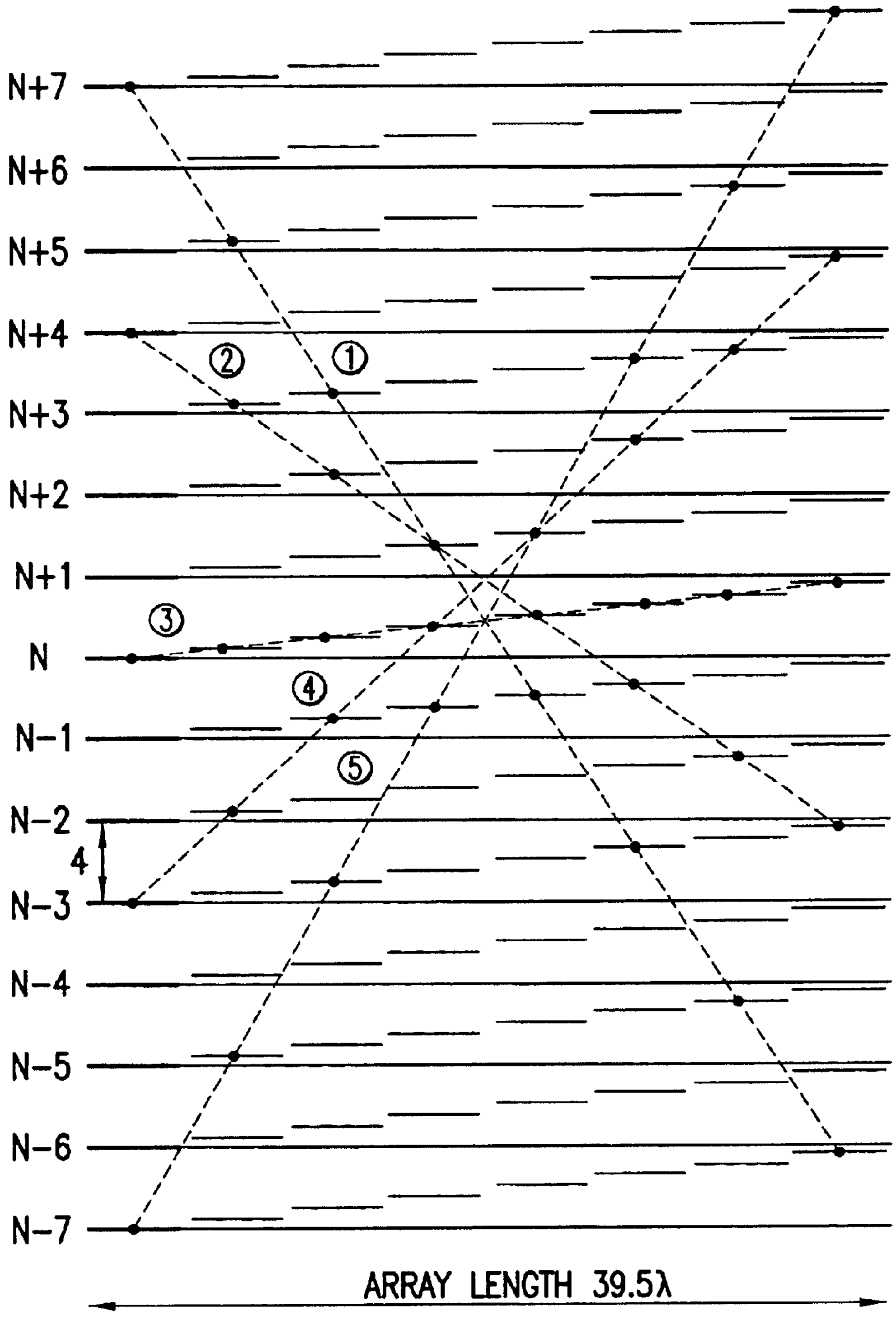
FIG. 3 is a diagram showing an example in which the invention is applied to a case using signals received by the linear ultrasonic transducer array.

As shown in FIG. 3, a matched filter is used to the sample data train (3) which is obtained from a single scanning cycle. It is also possible to generate sample data trains on various lines (1), (2), (4) and (5) as shown in FIG. 3 by dividing the array into multiple areas (8 areas in FIG. 3) and using sample data obtained from different scanning cycles for incoming waves arriving from other directions corresponding to the lines (1), (2), (4) and (5) respectively. The beamforming performance can be improved by selecting an appropriate sample data train depending on the beam direction even when the incoming waves are short-pulse signals. The linear array steers the receiving beam, or forms individual receiving beams, in a sector area of about 100°. It is possible to improve the beamforming performance for all the receiving beams by determining combinations of different scanning cycles (sample data trains) according to the angles (beam numbers) of the individual receiving beams.

Now, there will be described below a specific example in which 80 receiving beams are formed at 1.5° angular intervals in a sector area of −59.25° (receiving beam 0) to +59.25° (receiving beam 79).

In FIG. 3, the direction of sample data train (1) is −56.3°, the direction of sample data train (2) is −35.0°, the direction of sample data train (3) is +5.7°, the direction of sample data train (4) is +41.2°, and the direction of sample data train (5) is +59.5°. Receiving beams having smaller beam numbers than a middle value −45.64° of sample data train (1) and sample data train (2) are formed by using data of sample data train (1). Dividing the receiving beams at the middle of the angle between adjacent sample data trains, there is the following relationship between the beam numbers and sample data trains to be applied.

Beams 0 (−59.25°) to 9 (−45.75°): Sample data train (1)
Beams 10 (−44.25°) to 29 (−15.75°): Sample data train (2)
Beams 30 (−14.25°) to 55 (+23.75°): Sample data train (3)
Beams 56 (+24.75°) to 73 (+50.25°): Sample data train (4)
Beams 74 (+51.75°) to 79 (+59.75°): Sample data train (5)

Figure 4:
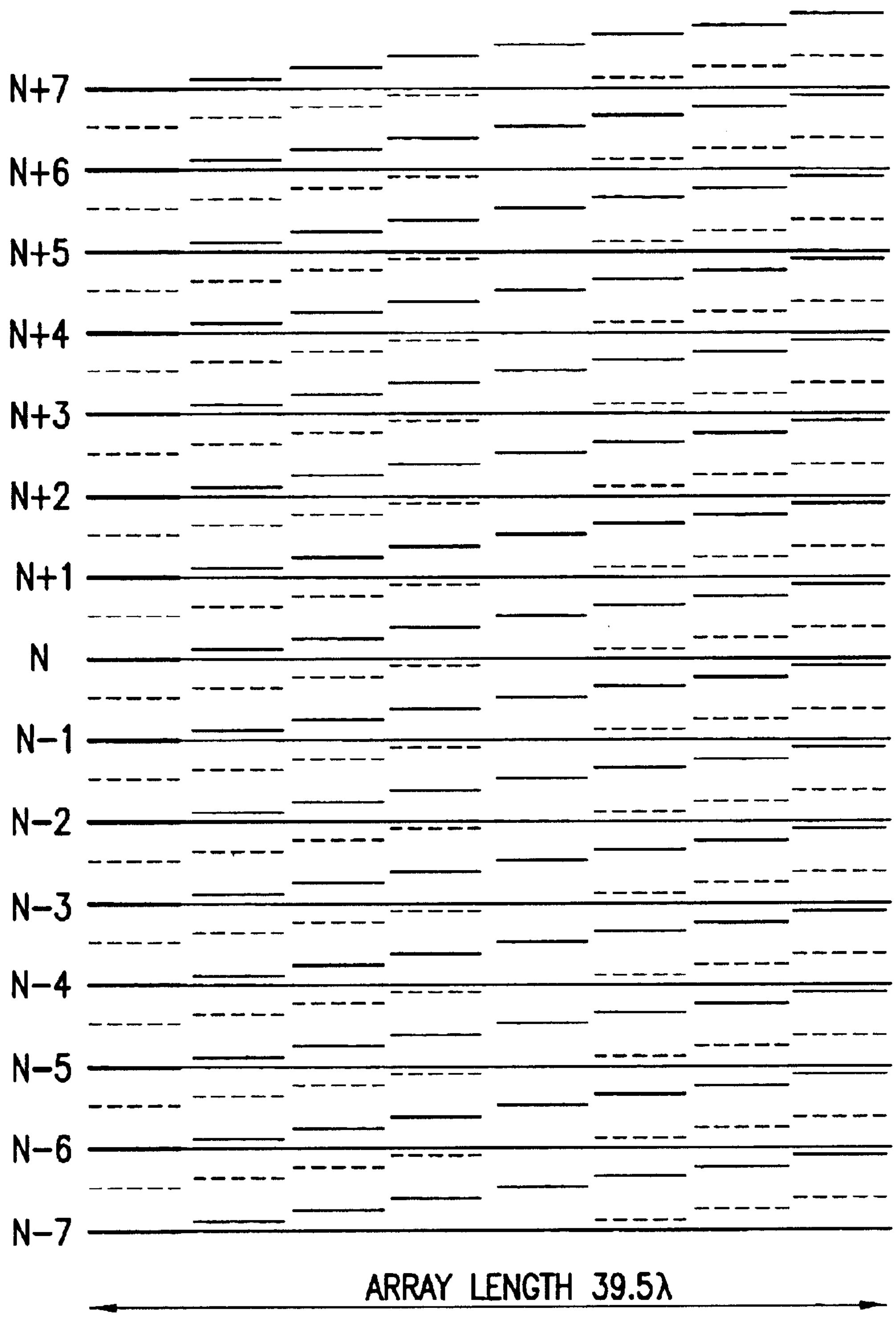
FIG. 4 is a time chart showing an example in which the invention is applied to a case using interpolated data generated based on the signals received by the linear array.

FIG. 4 is a time chart showing a case in which new sample data are generated by further making interpolation between each scanning cycle and its succeeding scanning cycle. The aforementioned method of generating the sample data trains using multiple scanning cycles might be further improved by performing the sampling operation at higher speeds, repeating the oblique steplike sampling operation at a scanning cycle corresponding to two times the wavelength rather than four times the wavelength, for example. However, there are cases where the sampling operation can not be performed at higher speeds than the scanning cycle equal to four times the wavelength due to system limitations in performing multiplexing operation. In such cases, the number of directions of the sample data trains are to be increased or their directions are to be optimized by generating intermediate sample data by interpolation between the individual scanning cycles without changing the scanning cycles which correspond to four times the wavelength as shown in FIG. 4. The directions of the sample data trains (1)–(5) in FIG. 3 are just examples to illustrate that it is possible to generate sample data trains of various angles. In practice, optimum sample data trains may be selected depending on the range of beam directions.

While the foregoing discussion has dealt with a case where the sample data of the individual scanning cycles are oblique steplike sample data, the invention is also applicable to cases where the sample data are oblique continuous sample data or parallel sample data obtained by simultaneously sampling signals picked up by all the receiving elements.

Figure 5:
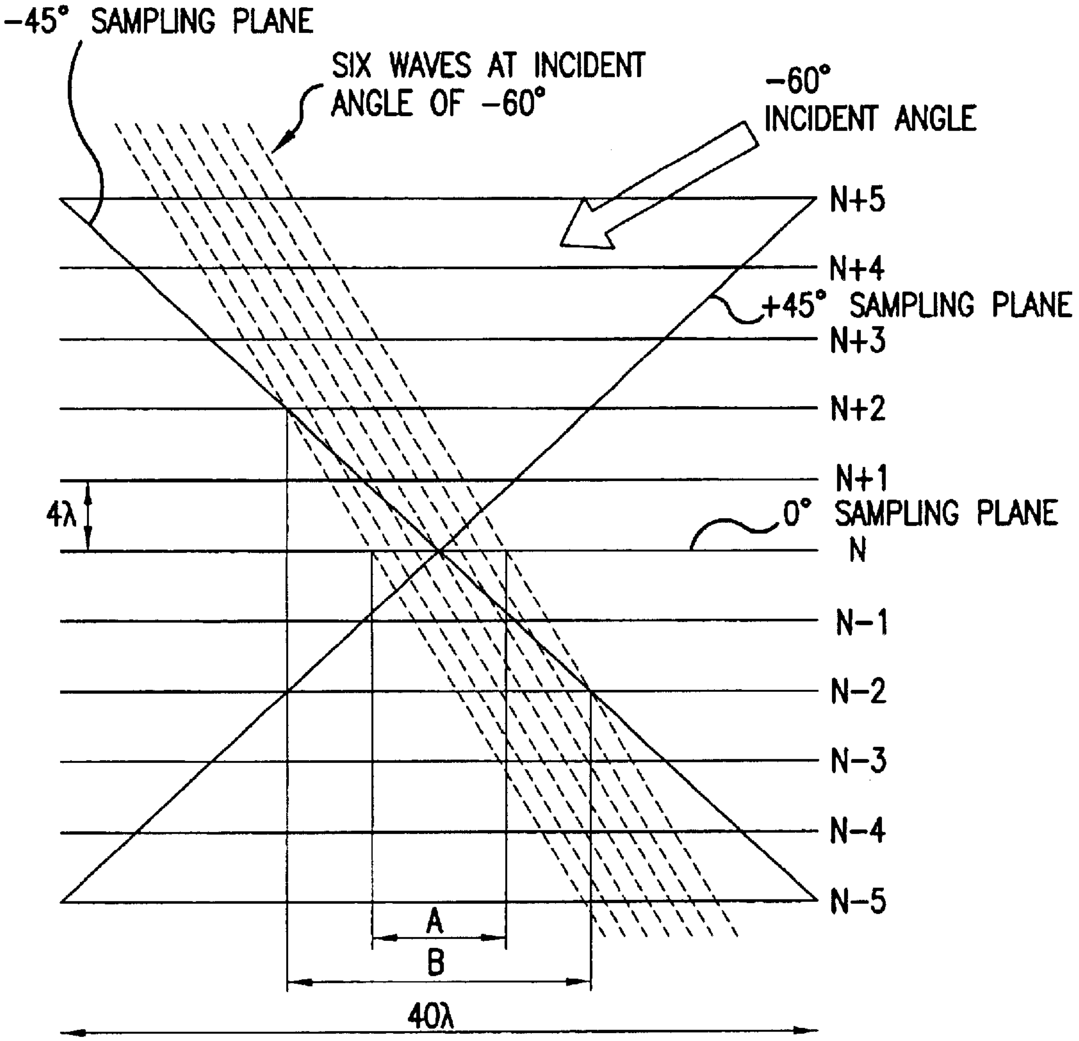
FIG. 5 is a diagram showing an example in which the invention is applied to a case using the signals received by the linear array.

Referring now to FIG. 5, there will be explained a method of improving receiving beam-forming operation using complex DFT in a receiving circuit connected to a linear array. Conventionally, a receiving beam has been formed by performing complex DFT operation using a sample data train derived from a scanning cycle N only. In this conventional method, when a short-pulse signal of waves whose duration is about 6 times the wavelength arrive from a −60° direction, echo signals are entered only to area A of the array of FIG. 5 at the same time, resulting in deterioration of the beamforming performance of the array.

On the other hand, the sample data contain information on both phase and amplitude, so that it is possible to shift the individual sample data forward or rearward by interpolation of the sample data in the case of sonar signals, for instance, whose bandwidth is not so wide (less than about ±20% of center frequency). In this case, it is possible to generate sample data trains of a sampling plane of an arbitrary angle by properly selecting the sample data of multiple scanning cycles. When sample data trains of a −45° sampling plane have been created as shown in FIG. 5, the incoming waves whose duration is 6 times the wavelength arriving from the −60° direction are received simultaneously by receiving elements of area B of the array illustrated in FIG. 5, so that beamforming accuracy is improved if the receiving beam is formed by using these sample data trains compared to the case where the sample data train derived only from the scanning cycle N is used.

Embodiments

Figure 6:
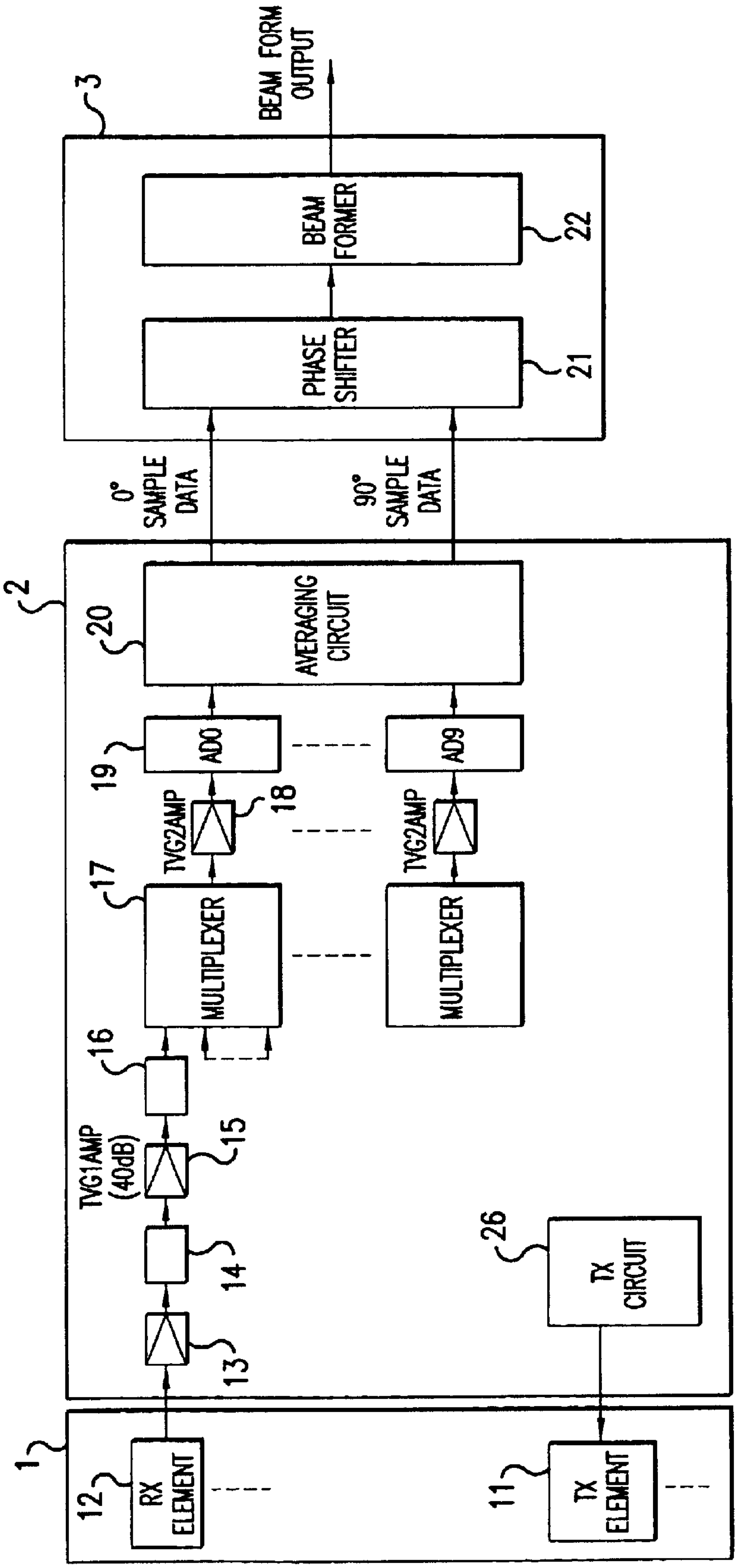
FIG. 6 is a block diagram of a bottom detecting sonar according to a preferred embodiment of the invention.
Figure 7A:
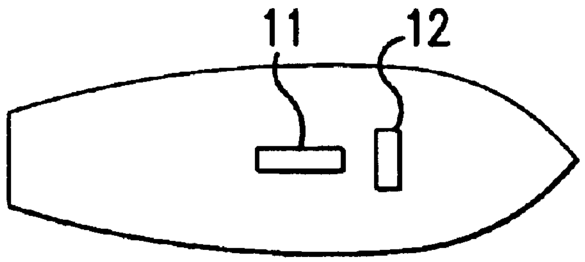
FIG. 7A is a diagram showing how transmitting and receiving transducers of the bottom detecting sonar are installed.
Figure 7B:
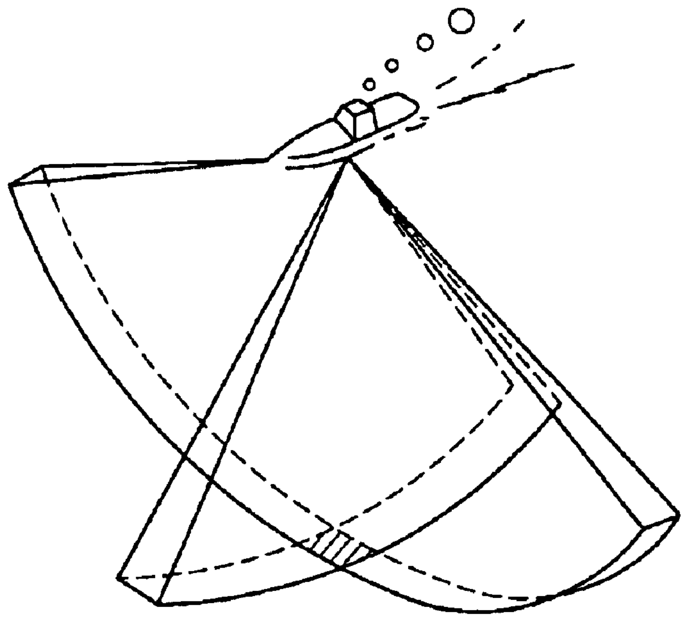
FIG. 7B is a diagram showing transmitting and receiving beams formed by the ultrasonic transducers of the bottom detecting sonar.

FIG. 6 is a block diagram of a bottom detecting sonar according to a preferred embodiment of the invention, FIG. 7A is a diagram showing how transmitting and receiving transducers of the bottom detecting sonar are installed, and FIG. 7B is a diagram showing transmitting and receiving beams formed by the transducers.

Referring to FIG. 7A, a transmitting transducer 11 and a receiving transducer 12 are ultrasonic transducer arrays, each array formed of a plurality of transducer elements. The transmitting transducer 11 is installed on the bottom of a ship such that its array direction becomes parallel to the bow-stern direction, while the receiving transducer 12 is installed on the ship's bottom such that its array is oriented in the athwartship direction.

Besides a transducer section 1 which includes the transmitting transducer 11 and the receiving transducer 12, there is mounted at the ship's bottom a transceiver unit 2 which applies burst signals to the transmitting transducer 11, receives return echoes and converts them into digital sample data. A processor unit 3 of the sonar is installed in the ship's cabin. The processor unit 3 performs receiving beamforming and bottom-detecting operations using the sample data entered from the transceiver unit 2.

A transmission circuit 26 of the transceiver unit 2 applies electric pulse signals to the individual elements of the transmitting transducer 11. Driven by these pulse signals, the elements of the transmitting transducer 11 transmit ultrasonic signals into the water. The transmission circuit 26 incorporates an oscillator which generates a 320 kHz signal, and applies the pulse signals to the individual elements of the transmitting transducer 11 with controlled timing such that a downward-directed, fan-shaped transmitting beam is formed just under the ship's hull as illustrated in FIG. 7B. The transmitting beam thus created has a fanlike shape approximately 1.5° thick in the ship's longitudinal direction and approximately 170° wide in the athwartship direction. In this sonar system, the pulse signals entered to the individual elements have a frequency of 320 kHz and their pulselength is as long as about 6 times the wavelength to improve distance detecting accuracy. Since the transmitting beam thus formed is directed vertically downward, echo signals returning from the sea bottom are substantially unaffected by the Doppler effect and, thus, have almost the same frequency as the transmitted pulse signals (320 kHz) even when the ship is moving.

Figure 8:
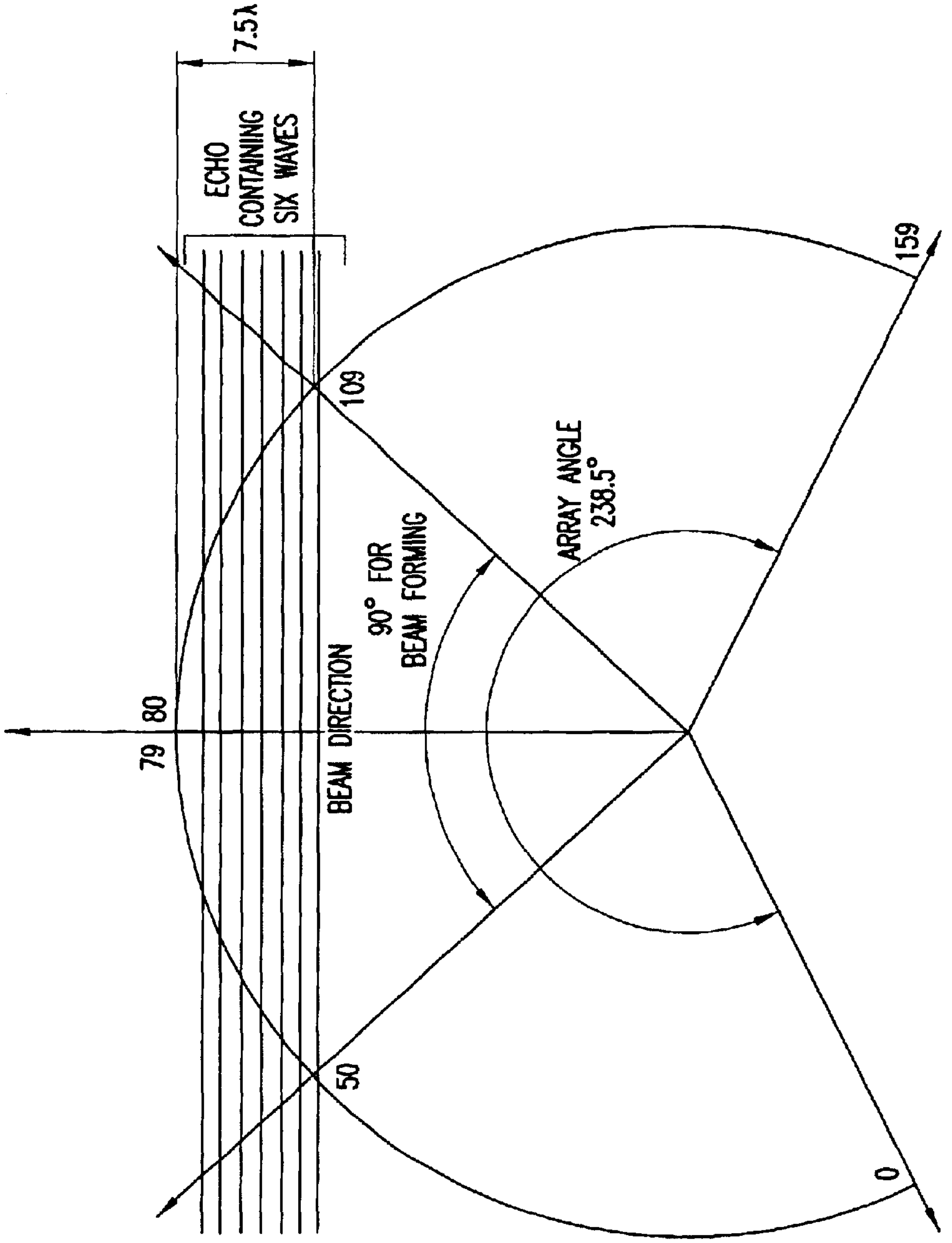
FIG. 8 is a diagram showing the configuration of the receiving transducer of the bottom detecting sonar.

The receiving transducer 12 has a generally cylindrical shape with 160 receiving transducer elements arranged on its circumference as shown in FIG. 8. The transceiver unit 2 and the processor unit 3 connected to the receiving transducer 12 sample the return echoes received by the individual elements and form the receiving beam having a fanlike shape approximately 20° wide in the ship's longitudinal direction and approximately 1.5° thick in the ship's athwartship direction as shown in FIG. 7B by comparing the received echoes with a reference by using a matched filter. To detect the sea bottom, this receiving beam is steered at a high speed from right to left a number of times while receiving the return echoes produced by each successive pulse transmission. Referring to FIG. 8, the generally cylindrical shape of the receiving transducer 12 has a radius of 125 mm, and a sectorial portion of this cylindrical shape is cut away, leaving a sectorial portion whose a central angle is 238.5°. The 160 receiving transducer elements are arranged at 1.5° intervals on this 238.5° sectorial portion.

The echo signals received by the individual elements of the receiving transducer 12 are entered to the transceiver unit 2. In the transceiver unit 2, the signals received by the individual elements are amplified by separate preamplifiers 13, filtered by filters 14 and amplified by time-variable-gain (TVG) amplifiers 15. The filters 14 are bandpass filters which remove frequency components outside of a specific frequency band around the transmission frequency (320 kHz) of the transmitting transducer 11. The return echoes are narrow-band ultrasonic signals of approximately 320 kHz as mentioned above. These bandpass filters 14 remove such undesirable noise components as noise generated by ultrasonic equipment and sea noise which do not fall within the pass band of the bandpass filters 14.

The TVG amplifiers 15, or the time-varied-gain amplifiers 15, are of a type whose gain is increased with the lapse of time after the transmitting transducer 11 has transmitted the a burst of ultrasonic waves. The reason why their gain is increased with time is that the more the time elapses after a transmission of the ultrasonic waves, the further away the ultrasonic waves are reflected from. This means that it is necessary to receive return echoes of progressively decreased signal levels with the lapse of time due to an increase in the distance traveled by the ultrasonic waves. The gain of the TVG amplifiers 15 is progressively increased with time to make up for the progressively weakening return echoes. To remove noise produced by the TVG amplifiers 15, simple filters 16 are inserted in a succeeding stage of the individual TVG amplifiers 15. The echo signals which have been passed through these filters 16 are entered to multiplexers 17 which multiplexes the signals from the 160 receiving transducer elements into 10 channels using a time-division multiplexing technique. Specifically, the echo signals of upstream channels numbered 10n+k are entered to the multiplexers 17 of downstream channels numbered k, where k is an integer from 0 to 9 and n is an integer from 0 to 15. More specifically, the signals from the elements 0, 10, 20, . . . , 140, 150 are entered to multiplexer No. 0, the signals from the elements 1, 11, 21, . . . , 141, 151 are entered to multiplexer No. 1, . . . , and the signals from the elements 9, 19, 29, . . . , 149, 159 are entered to multiplexer No. 9. Operating in synchronism with one another, the multiplexers Nos. 0 to 9 sequentially switch their input signals by incrementing the integer variable n.

The return echo signals multiplexed and combined to 10 channels are individually amplified again by second TVG amplifiers 18. While typical TVG amplifiers have a controllable gain range of about 40 dB, a TVG range of 40 dB or more is needed to scan a wide area of the sea bottom. This is why the present embodiment employs a two-stage TVG amplifier configuration.

The signals amplified by the individual TVG amplifiers 18 are sampled and converted into digital sample data by A/D converters 19 (AD0–AD9). Sampling timing of the A/D converters 19 and switching timing of the multiplexers 17 are controlled based on the aforementioned signal generated by the oscillator of the transmission circuit 26. Specifically, both the sampling timing of the A/D converters 19 and the switching timing of the multiplexers 17 are completely synchronized with the frequency of the transmitted pulse signals (return echo signals).

Figure 9:
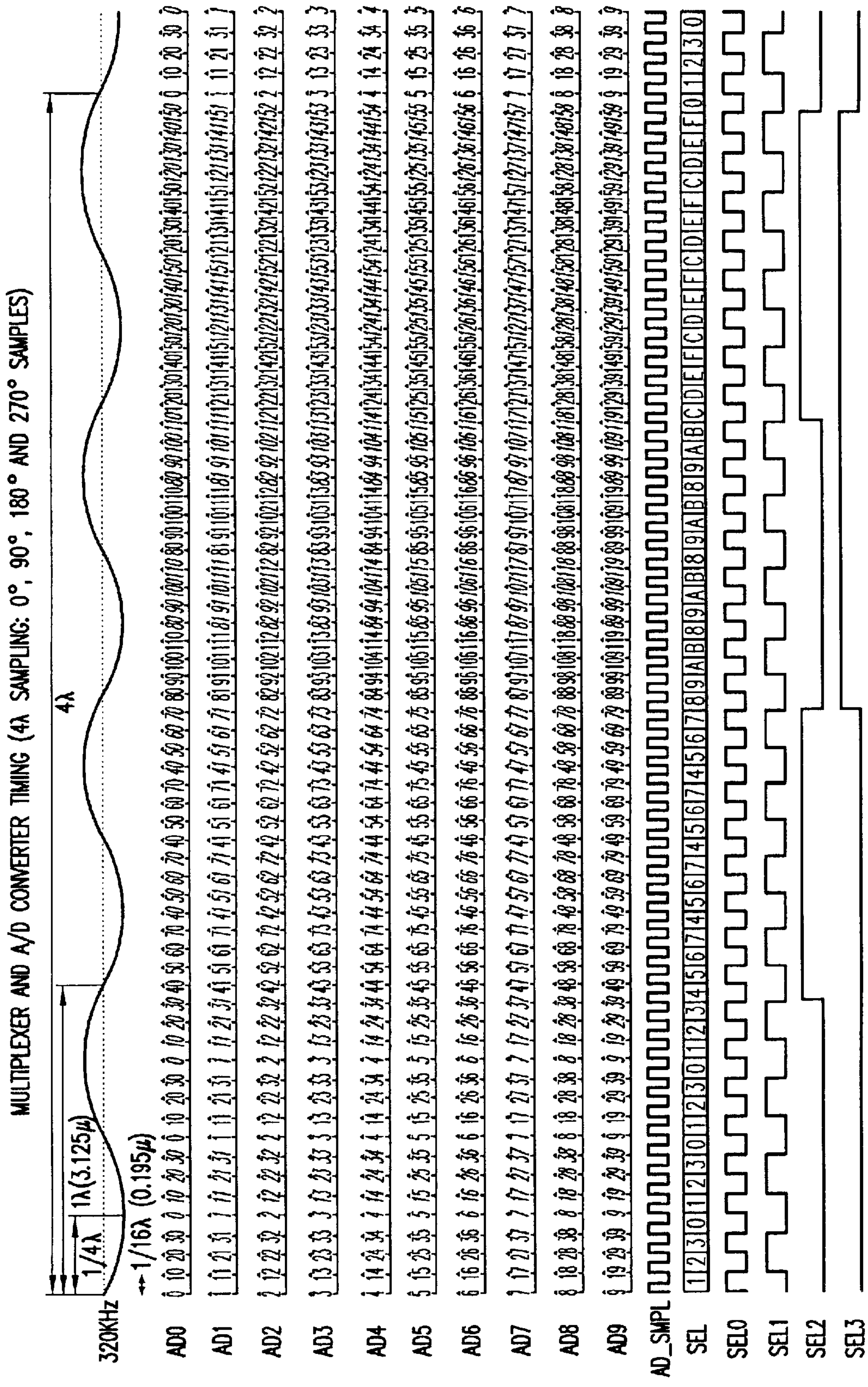
FIG. 9 is a sampling timing chart showing the operation of A/D converters of the bottom detecting sonar.

FIG. 9 is a diagram depicting the sampling timing of the A/D converters 19.

For the processor unit 3 in a succeeding stage to process the return echo signals in the form of complex-valued data, it is desirable that the return echo signals be converted into complex-valued data in sampling process. However, a process of mixing a real-valued signal with a cosine signal and a sine signal to separate it into in-phase portion I and quadrature portion Q signals and sampling them separately would complicate a circuit configuration and cause measurement errors due to phase shifts, for example.

Considering that the frequency of the received return echo signals is stable and a sampling clock is completely synchronized with this frequency, complex-valued sample data are generated by sampling the return echo signals twice with a phase delay of 90° and then using one part of the data as an in-phase portion and the other part of the data as a quadrature portion in this sonar system. Furthermore, the present sonar system samples the return echo signals four times with a phase delay of 90° (0°, 90°, 180°, 270°) and removes a DC bias by combining 0° sample data with 180° sample data, and 90° sample data with 270° sample data.

Since the echo signals from the 160 elements are multiplexed into the 10 channels using the time-division technique as stated above, each of the 10 channels handles the echo signals from the 16 elements. Each of the 10 channels samples the signals from the 4 elements during one complete cycle, or the period, (1λ) of the 320 kHz return echo signals. In other words, each channel samples the signals from the 16 elements during four times the period (4λ) of the 320 kHz return echo signals.

The sampling timing is explained in further detail with reference to FIG. 9. The signals from the elements 10*n*+0 (where n=0, 1, . . . , 15) are selectively entered to the A/D converter AD0 via the relevant multiplexer 17. Also, the signals from the elements 10*n*+1 are selectively entered to the A/D converter AD1 via the relevant multiplexer 17. Similarly, the signals from the elements 10*n*+k (where k=0, 1, . . . , 9) are selectively entered to each A/D converter ADk. The individual A/D converters AD0–AD9 sample the input signals at regular time intervals of 1/16λ (0.195625 μs). Therefore, 16 cycles of sampling operation are performed during the period 1λ.

Each A/D converter ADk samples the signals from the elements k, 10+k, 20+k and 30+k by switching these elements one after another during a first cycle of 1λ. Since the A/D converter ADk of each channel samples the input signals four times during the period 1λ at intervals of ¼λ (=1/16λ×4), four data are obtained from each element with relative phase delays of 0°, 90°, 180° and 270°.

In a second cycle of the period 1λ, the A/D converter ADk of each channel samples the input signals from the elements 40+k, 50+k, 60+k and 70+k by switching these elements one after another. Further, in a succeeding cycle of the period 1λ, the A/D converter ADk of each channel samples the input signals from the elements 80+k, 90+k, 100+k and 110+k by switching these elements one after another. Again in a succeeding cycle of the period 1λ, the A/D converter ADk of each channel samples the input signals from the elements 120+k, 130+k, 140+k and 150+k by switching these elements one after another. As the individual A/D converters ADk sample the input signals in this manner, it is possible to obtain four data from each element with relative phase delays of 0°, 90°, 180° and 270° during a 4λ cycle time. This operation is performed during the 4λ cycle time in each scanning cycle.

In the sonar system of this embodiment, the sampling operation of all the A/D converters ADk is completely synchronized and the multiplexers 17 are switched in synchronism with one another even after the sampling operation. As long as the A/D converters ADk are of a type whose operating frequency is about 20 MHz, only those input signals which are entered immediately before sampling affect sample data. Therefore, if the multiplexers 17 are switched and the TVG amplifiers 18 of their succeeding stage operate immediately after the sampling of the input signals, noise caused by select signals of the multiplexers 17 and by changes in output data of the A/D converters 19 is sufficiently decreased before the succeeding sampling operation (0.195625 μs later), so that the noise does not cause any adverse effects on the succeeding sampling operation. In addition, because switching of the multiplexers 17 and the A/D converters 19 of the 10 channels is synchronized as stated earlier, switching noise which may occur in one channel does not enter and adversely affect another channel.

The sonar system of this embodiment employs an oblique steplike sampling timing to avoid the noise which could potentially occur when the multiplexing operation is performed by the switching of the multiplexers 17 as described above.

The sample data thus produced by the A/D converters 19 are entered to an averaging circuit 20. The averaging circuit 20 averages two pairs of the sample data, that is, the 0° sample data and the 180° sample data, and the 90° sample data and the 270° sample data, for each element. Since the timing of these sample data is set to synchronize with the same clock as the transmitting frequency (the frequency of the return echoes), the 0° sample data and the 180° sample data should have almost the same amplitude levels but values of opposite polarities and, likewise, the 90° sample data and the 270° sample data should have almost the same amplitude levels but values of opposite polarities. It is therefore possible to calculate 0° sample data (in-phase data R) excluding a DC offset component by performing an averaging operation expressed by (0° sample data −180° sample data)/2. The DC offset component is produced due to an alternating current (ac) coupling with asymmetrical positive and negative characteristics or an offset error of the A/D converters 19. It is also possible to calculate 90° sample data (quadrature data I) excluding a DC offset component by performing an averaging operation expressed by (90° sample data−270° sample data)/2. The averaging circuit 20 outputs the 0° sample data and the 90° sample data as the complex-valued sample data.

Figure 10:
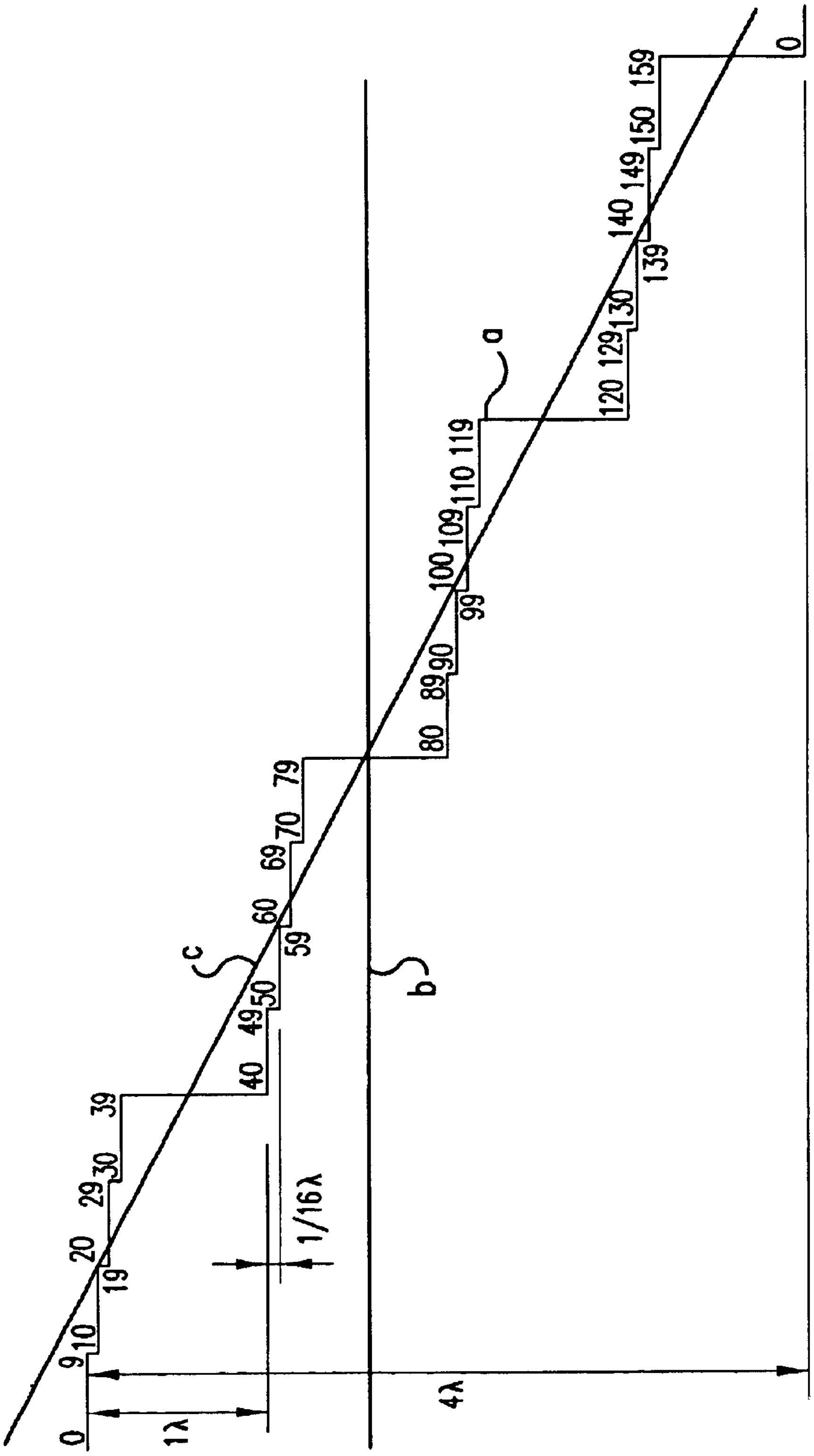
FIG. 10 is a diagram showing a phase-shifting method used in a processor unit of the bottom detecting sonar.

FIG. 10 is a diagram showing timing of the sample data output from the averaging circuit 20. The averaging circuit 20 outputs the sample data at sampling times taken in an oblique steplike form as shown by a broken line a in FIG. 10. Of the four sets of sample data sampled at 0°, 90°, 180° and 270°, the 180° sample data and the 270° sample data are used for removing the DC offset component and the 90° sample data are used as the quadrature data, so that the complex-valued sample data at the timing of the 0° sample data are entered to the processor unit 3.

These complex-valued sample data are transmitted to the processor unit 3 in the ship's cabin via a high-speed link made of an optical fiber, for example. Since the A/D converters 19 of the transceiver unit 2 and their succeeding stages perform digital processing, it is not necessary that sample data transmission timing be exactly synchronized with timing shown by the steplike broken line a in FIG. 10. The sample data should just be sent from the transceiver unit 2 to the processor unit 3 in such a manner that succeeding processing operations can be executed on a real-time basis. Although the data derived from the elements 0 to 9 are of the same timing, transmission of these data from the transceiver unit 2 to the processor unit 3 is made in a serial form and they are processed as the data of the same timing in the processor unit 3.

While the receiving transducer 12 has a generally cylindrical shape having a central angle is 238.5° on which the 160 receiving transducer elements are arranged at 1.5° intervals as shown in FIG. 8, the receiving beam is formed by using 60 elements contained in an approximately 90° sector centered on the direction of the receiving beam at any given instant. When the receiving beam is formed by using the elements 0 to 59, the receiving beam is pointed in a direction just between the elements 29 and 30 as viewed from the center of the receiving transducer 12. Assuming that this direction is 0°, the element 0 is located in a 44.25° direction and the element 59 is located in a −44.25° direction.

The processor unit 3 forms a receiving beam using 60 adjacent transducer elements and steers the receiving beam from right to left. In other words, the processor unit 3 successively creates 101 receiving beams, including receiving beam 0 formed by the elements 0 to 59 to receiving beam 100 formed by the elements 100 to 159.

Since the receiving transducer 12 has the radius of 125 mm as stated earlier, the elements 29 and 30 oriented in directions closest to the direction of the receiving beam 0 are separated from the rearmost elements 0 and 59 by a distance equivalent to about 7.5 times the wavelength. Specifically, this distance is calculated as follows:

$$125\times(1-1/\sqrt{2})/(1500/320)\approx 7.5$$

As previously mentioned, the pulselength of the burst waves transmitted from the transmitting transducer 11 is made as short as 6 times the wavelength to improve the distance detecting accuracy in this bottom detecting sonar. For this reason, the return echoes also have a short pulselength and would not simultaneously hit the 60 transducer elements which are used for forming each receiving beam. Thus, the processor unit 3 uses the sample data obtained from two scanning cycles (preceding and current scanning cycles) so that the return echoes received by all the 60 transducer elements would be used to form the receiving beam. Since the scanning cycle corresponds to four times the wavelength and the return echoes travel a distance equal to four times the wavelength between the preceding scanning cycle and the current scanning cycle, the return echoes fall in a range of $6\lambda+4\lambda$ which covers the distance of 7.5 times the wavelength.

Accordingly, the transducer elements of channels 0 through 59 which form the receiving beam 0 are divided into two groups, that is, group 1 including the rear elements 0 through 9 and 53 through 59, and group 2 including the frontal elements 10 through 52. The receiving beam is formed by using the data sampled in the current scanning cycle for the elements of group 1 to which the return echoes arrive late and the data sampled in the preceding scanning cycle, or during a time period four times the wavelength earlier than the current scanning cycle, for the elements of group 2 to which the return echoes arrive earlier.

Groups 1 and 2 mentioned above are related to grouping of the transducer elements applicable to a case where the sample data are sampled by the aforementioned oblique steplike sampling operation. In a case where the data are sampled at the same timing, group 1 includes the elements 0 through 8 and 51 to 59, and group 2 includes the elements 9 to 50.

Figure 11:
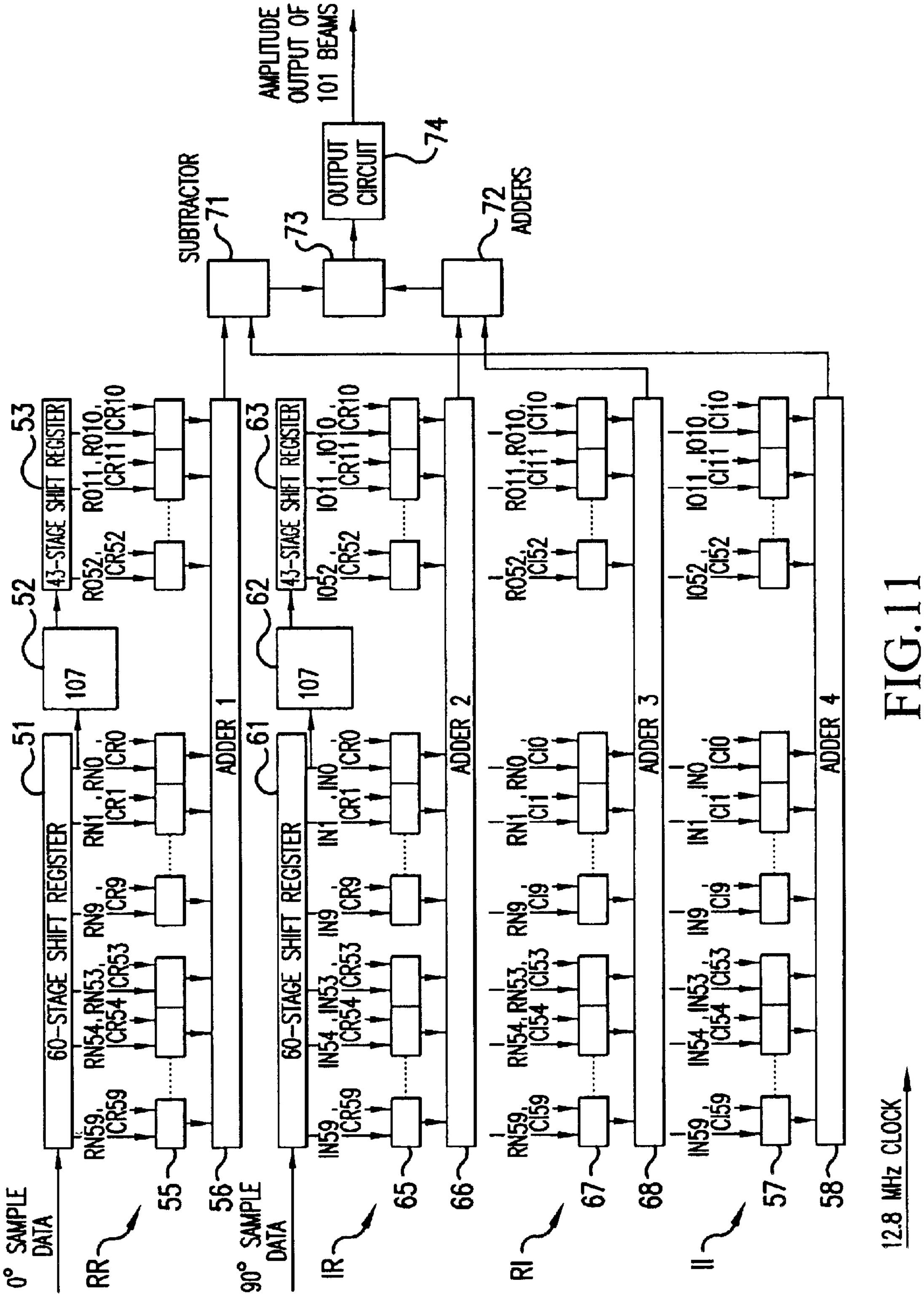
FIG. 11 is a diagram showing the configuration of a beamformer incorporated in the processor unit.

FIG. 11 is a diagram showing the configuration of a beamformer 22 incorporated in the processor unit 3. The beamformer 22 is a circuit for forming the receiving beams using 60-point complex matched filters. The beamformer 22 incorporates 107-stage shift registers 52, 62 and 43-stage shift registers 53, 63 in addition to 60-stage shift registers 51, 61 which are matched filters. The shift registers 51 through 53 and the shift registers 61 through 63 are separately connected in series.

The 0° sample data which are the in-phase data R of the complex-valued sample data are entered from the transceiver unit 2 in the preceding stage to an input terminal of the shift register 51. Also, the 90° sample data which are the quadrature data I of the complex-valued sample data are entered from the transceiver unit 2 in the preceding stage to an input terminal of the shift register 61. The receiving beam 0 is formed when the sample data of the element 59 obtained in the current scanning cycle has been entered to ends of the 60-stage shift registers 51, 61. Next, the sample data are shifted one stage forward and the receiving beam 1 is formed when the sample data of the element 60 has been entered to the ends of the 60-stage shift registers 51, 61. The sample data are shifted one stage forward each time the receiving beam number is incremented in this fashion, and coefficients (indicated by CRn and CIn) of multipliers may have fixed values.

CRn and CIn are coefficients of the complex matched filters used for weighting in window operation and for correcting relation between element positions and sound velocity. The matched filters form the receiving beams by adding vectors of received signals of the individual transducer elements as a whole. The 60-stage shift registers 51, 61 have output terminals for outputting the sample data derived from the elements 0–9, 53–59 while the 43-stage shift registers 53, 63 have output terminals for outputting the sample data derived from the elements 10 through 52.

The 0° sample data, or the in-phase data R of the complex-valued sample data, are entered to the 60-stage shift registers 51, the 107-stage shift registers 52 and the 43-stage shift registers 53 in this order. Similarly, the 90° sample data, or the quadrature data I of the complex-valued sample data, are entered to the 60-stage shift registers 61, the 107-stage shift registers 62 and the 43-stage shift registers 63 in this order.

In FIG. 11, designated by RNn and ROn are the 0° sample data (in-phase data), of which RNn indicates data entered by sampling in the current scanning cycle and ROn indicates data entered by sampling in the preceding scanning cycle. Also, designated by INn and IOn are the 90° sample data (quadrature data), of which INn indicates data entered by sampling in the current scanning cycle and IOn indicates data entered by sampling in the preceding scanning cycle. Further, designated by CRn and CIn are reference coefficients of the complex matched filters, of which CRn indicates an in-phase coefficient of the reference and CIn indicates a quadrature coefficient of the reference. Numbers suffixed to the aforementioned symbols indicate element numbers. The reference coefficients CRn, CIn and the sample data RNn, ROn, INn, IOn to be multiplied are suffixed with numbers 0 to 59. Among them, the reference coefficients CRn, CIn suffixed with numbers 0 to 59 have fixed values. In contrast, the data obtained from the elements 0–159 entered to the shift registers are sequentially allocated as the sample data RNn, ROn, INn, IOn. The receiving beam 0 is formed such that the beam direction matches the direction between the elements numbers n=29, 30.

The matched filters are formed of four filter lines RR, IR, RI, II as shown in FIG. 11. Designated by RR is a filter which calculates the degree of correlation between RNn, ROn (in-phase data) and CRn (in-phase coefficient). This filter RR includes 60 multipliers 55 which multiply the reference coefficient CRn by the 0° sample data with corresponding timing (beam direction) and an adder 56 which adds up the results of multiplications. Also, designated by II is a filter which calculates the degree of correlation between INn, IOn (quadrature data) and CIn (quadrature coefficient). This filter II includes 60 multipliers 57 which multiply the reference coefficient CIn by the 90° sample data with corresponding timing (beam direction) and an adder 58 which adds up the results of multiplications. The result of addition by the adder 56, or a filter output (RR) of the filter line RR, and a filter output (II) of the filter line II are entered to a subtracter 71, which performs a subtraction (RR)–(II) and calculates a value representing the degree of correlation between phases of the in-phase portion of the complex-valued sample data and the in-phase portion of a complex-valued reference coefficient. Specifically, this correlation value expressing the correlation between the in-phase data and the in-phase coefficient is calculated as follows:

$$C1\cdot C2=M1e^{j\theta 1}\cdot M2e^{j\theta 2}=M1\cdot M2e^{j(\theta 1+\theta 2)}$$

$$C1\cdot C2=(R+jI)(CR+jCI)=(R\cdot CR-I\cdot CI)+j(I\cdot CR+R\cdot CI) \quad (1)$$

On the other hand, designated by IR is a filter which calculates the degree of correlation between INn, IOn (quadrature data) and CRn (in-phase coefficient). This filter IR includes 60 multipliers 65 which multiply the reference coefficient CRn by the 90° sample data with corresponding timing (beam direction) and an adder 66 which adds up the results of multiplications. Also, designated by RI is a filter which calculates the degree of correlation between RNn, ROn (in-phase data) and CIn (quadrature coefficient). This filter RI includes 60 multipliers 67 which multiply the reference coefficient CIn by the 0° sample data with corresponding timing (beam direction) and an adder 68 which adds up the results of multiplications. The result of addition by the adder 66, or a filter output (IR) of the filter line IR, and a filter output (RI) of the filter line RI are entered to an adder 72, which performs an addition (IR)+(RI) and calculates a value representing the degree of correlation between phases of the in-phase portion of the complex-valued sample data and the in-phase portion of a complex-valued reference coefficient. Specifically, this correlation value is calculated by equation (1) above.

Calculation results of the subtracter 71 and the adder 72 are entered to an amplitude detector 73. The amplitude detector 73 calculates the amplitude of the receiving beam based on the calculation results entered. The amplitude can be calculated by equation $(I^2+Q^2)^{1/2}$. If it is desired to perform this calculation by using a hardware device, a table or a circuit having an approximation capability may be used. An output circuit 74 is a circuit which is required because the elements are not provided all around the receiving transducer 12 as shown in FIG. 8. The output circuit 74 takes out 101 beams at clocks 59 to 159 of the shift registers. These 101 beams are the earlier-mentioned 101 receiving beams from the receiving beam 0 oriented in the direction just between the elements 29 and 30 up to the receiving beam 100 oriented in the direction just between the elements 129 and 130.

If the input 0° sample data and 90° sample data are data of the same timing that are arranged along the circumference, 30 stages of a first half and 30 stages of a second half of each of the 60-stage shift registers 51, 61 become symmetrical in the matched filters. Therefore, if each shift register is folded at its middle and multiplication is performed after addition, it is possible to halve the number of multipliers. This is also applicable to the 43-stage shift registers, in which case it would be 42-stage shift registers with n=9 to 50 since they perform simultaneous sampling operation.

Figure 12:
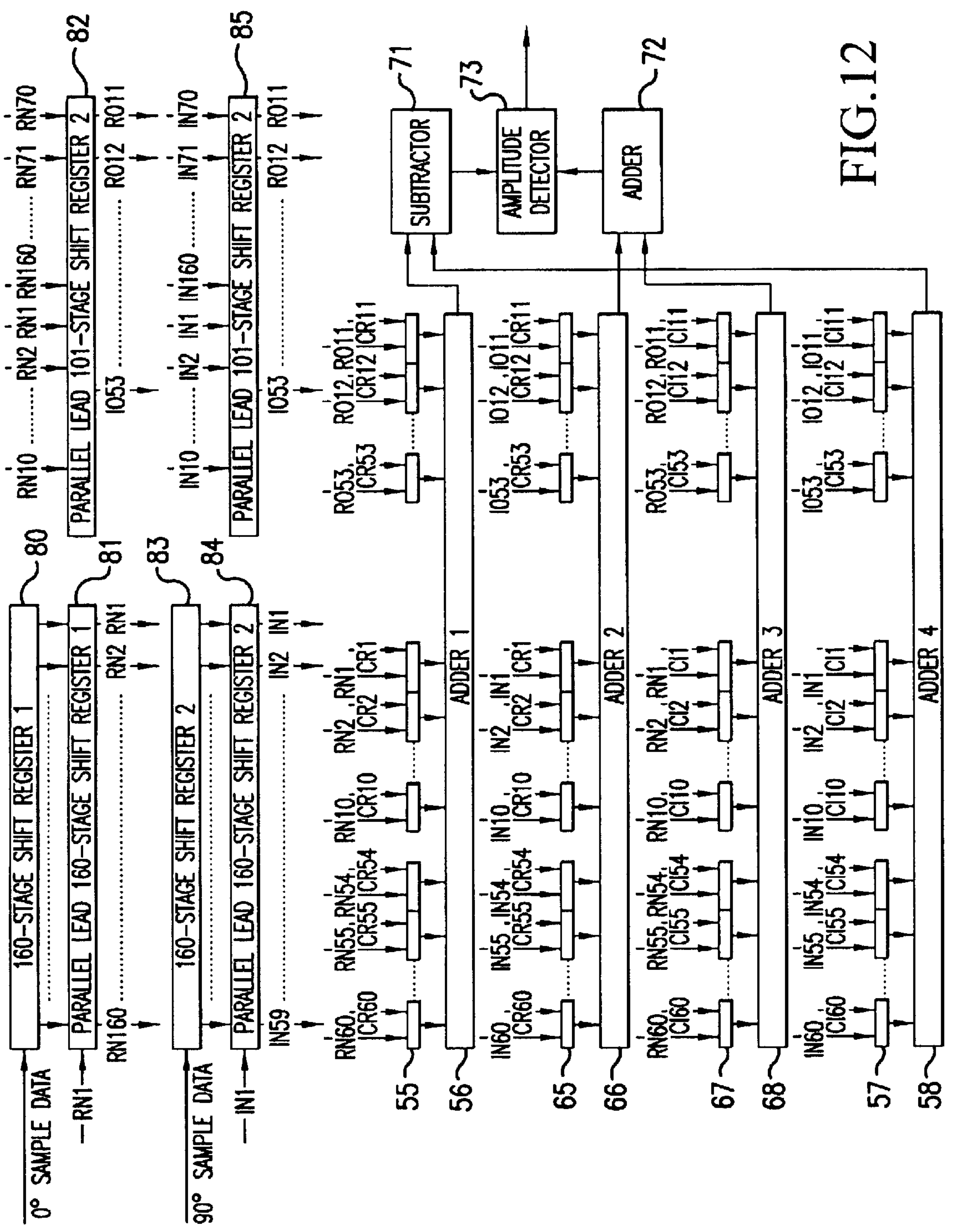
FIG. 12 is a diagram showing another example of a beamformer.

FIG. 12 is a diagram showing another example of a beamformer using the partially cutaway cylindrical transducer shown in FIG. 8. If the matched filters of FIG. 11 are made by using hardware circuitry, portions for performing the multiplication of the sample data and coefficients take the physically largest area and, therefore, it is necessary to operate the multipliers using time-division technique. The beamformer of FIG. 11 performs filtering operation even during a time period (in which a point of discontinuity of data, element 159 to element 0, exists in a range of n=0 to 59) where the beamformer can not form a receiving beam, and the output circuit 74 abandons unusable data. The beamformer of FIG. 12, configured generally by adding parallel load shift registers to the beamformer of FIG. 11, eliminates the aforementioned unnecessary operation and reduces the number of necessary multiplications and additions, thereby allowing a reduction in the scale of circuitry. In the beamformer of FIG. 11, it is necessary for the four complex matched filters RR, IR, RI, II to execute 240 multiplications as many as 12,800,000 times per second (=scanning cycle(320 kHz/4)×the number of date shifts (160)). In contrast, the number of filtering operations to be executed by the beamformer of FIG. 12 for actually forming receiving beams is 101, so that the number of operations can be reduced to 8,080,000 times per second (=(320 kHz/4)×101).

More specifically, the beamformer of FIG. 12 is configured by adding parallel load 160-stage shift registers 81, 84 and parallel load 101-stage shift registers 82, 85 to the beamformer of FIG. 11. 160-stage shift registers 80 and 83 of FIG. 12 are equivalent to shift registers made by connecting the 60-stage shift register 51 and the 107-stage shift register 52 of FIG. 11 in series and the 60-stage shift register 61 and the 107-stage shift register 62 of FIG. 11 in series, respectively.

The 0° sample data and 90° sample data delivered from a receiving circuit are entered to the 160-stage shift register 80 and the 160-stage shift register 83, respectively. When sample data RN0, IN0 have been transferred to ends of the 160-stage shift registers 80, 83 and 160 data RN0–RN159, IN0–IN159 have become ready for use (at intervals corresponding to four times the wavelength), these data trains are loaded at the same time to the parallel load 160-stage shift registers 81 and 84.

The parallel load 101-stage shift registers 82 and 85 are connected to the parallel load 160-stage shift registers 81 and 84, respectively. The data obtained from a preceding scanning cycle are loaded from the parallel load 160-stage shift registers 81, 84 to the parallel load 101-stage shift registers 82, 85 at the same time when the data are loaded from the 160-stage shift registers 80, 83 to the parallel load 160-stage shift registers 81, 84. Although the receiving beam can not be formed during a period from the beginning of entry of the 0° sample data and 90° sample data until these data are entered twice (eight times the wavelength) in this circuit configuration, this causes no problem at all since the data are derived from echoes extreme proximity in this period.

After parallel loading, beamforming and shifting of the parallel load shift registers are carried out 101 times. This operation is just to be finished until a succeeding parallel loading operation. It is possible to increase the number of multiplications that can be executed by one multiplier using the time-division technique and reduce the overall scale of the circuitry by eliminating unnecessary mathematical operation for beamforming as stated above.

Although the coefficients C have fixed values in the matched filters of FIGS. 11 and 12, the coefficients C may be continuously varied during the beamforming operation to alter the focus of the receiving beams (dynamic focusing). This dynamic focusing operation would help improve the beamforming performance especially for echoes from close distances.

Figure 13:
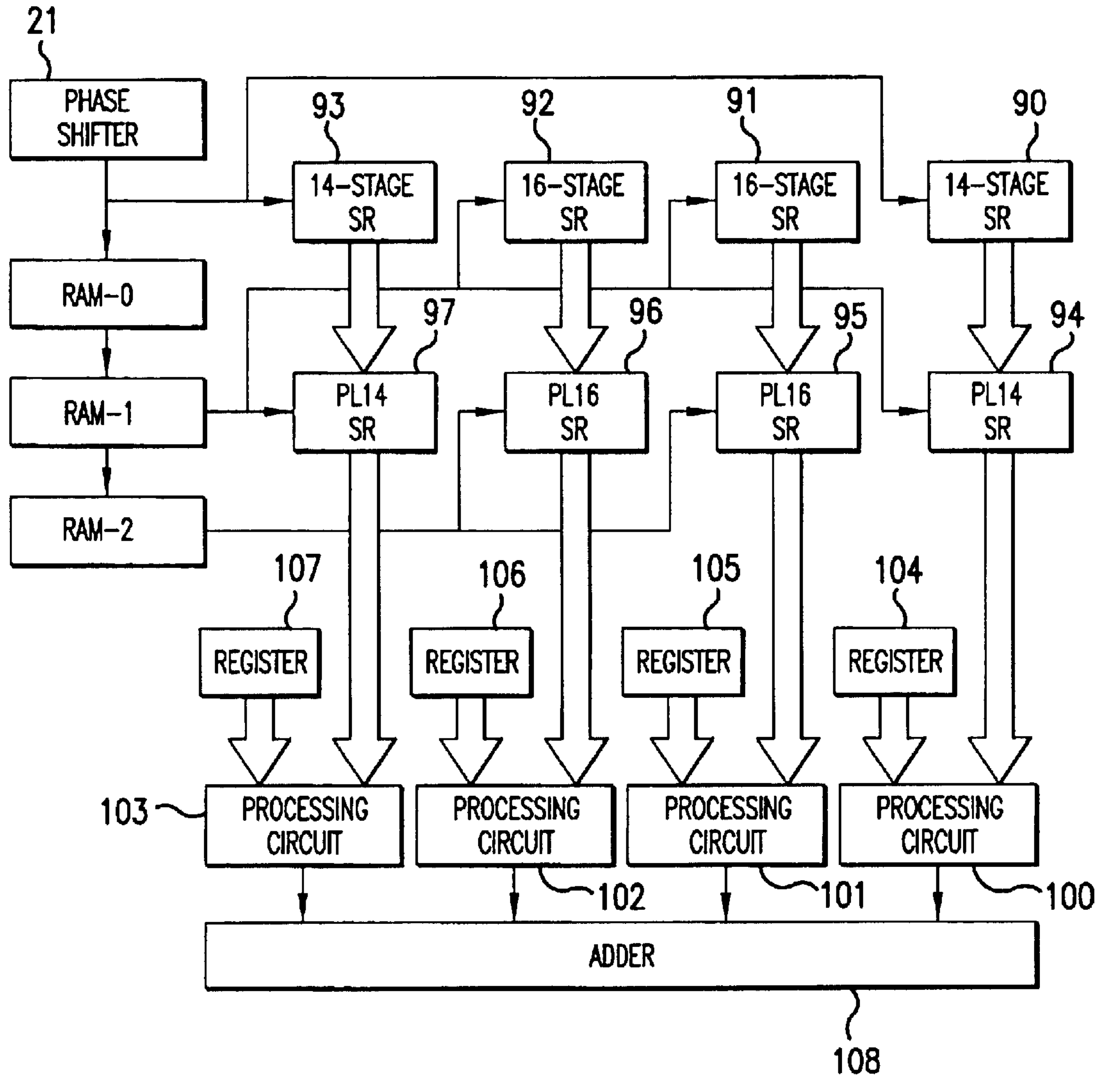
FIG. 13 is a diagram showing still another example of a beamformer in which random-access memories (RAMs) are used instead of the shift registers of FIG. 12.

FIGS. 13 through 16 are diagrams showing the configuration and operation of another example of a beamformer. This beamformer is configured by replacing the shift registers of the beamformer of FIG. 12 with a number of RAMs. FIG. 13 is a circuit configuration diagram of the beamformer of this example.

Since the number of data that can be processed in parallel by each processing circuit is 16 in this beamformer, 60 sample data forming the receiving beam are divided into four sets including 14, 16, 16 and 14 sample data before they are processed. Among them, central two sets of 16 sample data are data sampled in an earlier scanning cycle since they are obtained from return echoes arriving earlier, and outer (left and right) two sets of 14 sample data are data sampled in the latest scanning cycle since they are obtained from return echoes arriving later.

There are provided 16-stage shift registers 91, 92 and parallel load 16-stage shift registers 95, 96, coefficient registers 105, 106 storing their filter coefficients, and processing circuits 101, 102 for performing matched filter processing operation for the central two sets of 16 sample data. Further, there are provided 14-stage shift registers 90, 93 and parallel load 14-stage shift registers 94, 97, coefficient registers 104, 107 storing their filter coefficients, and processing circuits 100, 103 for performing matched filter processing operation for the outer two sets of 14 sample data. Results of the calculation performed by the processing circuits 100 through 103 are added by an adder 108.

Although only one line is shown for each sample data in FIG. 13, there are provided two lines of constituent parts for in-phase and quadrature portions of each sample data. Each of the processing circuits 100 through 103 performs four cycles of mathematical operation to obtain an in-phase portion of the product of an in-phase portion of data and coefficient, a quadrature portion of the product of the in-phase portion of data and coefficient, an in-phase portion of the product of a quadrature portion of data and coefficient, and a quadrature portion of the product of the quadrature portion of data and coefficient.

The sample data are delivered from a phase shifter 21, RAM-1 and RAM-2 to the individual shift registers and parallel load shift registers. RAM-0 is a RAM which buffers the latest sample data entered from the phase shifter 21 and has memory areas for storing 146 sample data obtained from the elements 14 through 159. The RAM-1 and RAM-2 also have memory areas for storing 146 sample data obtained from the elements 14 through 159. Since the sample data from the elements 0 through 13 are loaded directly to the shift registers, a RAM is not needed. This will be later described in detail.

The operation of this beamformer will be described hereinafter with reference to FIGS. 14A, 14B and 15. The phase shifter 21 shifts the phase of steplike sample data to convert them into oblique steplike sample data. Data for one scanning cycle, or data obtained from the elements 0 to 159, are sequentially entered to the RAM-0, the 14-stage shift register 90 and the 14-stage shift register 93.

The sample data obtained from the elements 13 to 0 in the latest scanning cycle are entered to the 14-stage shift register 90. The sample data obtained from the elements 159 to 146 in the latest scanning cycle are entered to the 14-stage shift register 93. Also, the sample data obtained from the elements 14 to 29 in an earlier scanning cycle are entered to the 16-stage shift register 91. The sample data obtained from the elements 30 to 45 in the earlier scanning cycle are entered to the 16-stage shift register 92. Here, it is to be noted that the data obtained from the earlier scanning cycle are designated as 0-*n* (where n=0 to 159) and the data obtained from the latest scanning cycle are designated as 1-*n* (where n=0 to 159) in FIGS. 14A, 14B and 15.

Figure 14A:
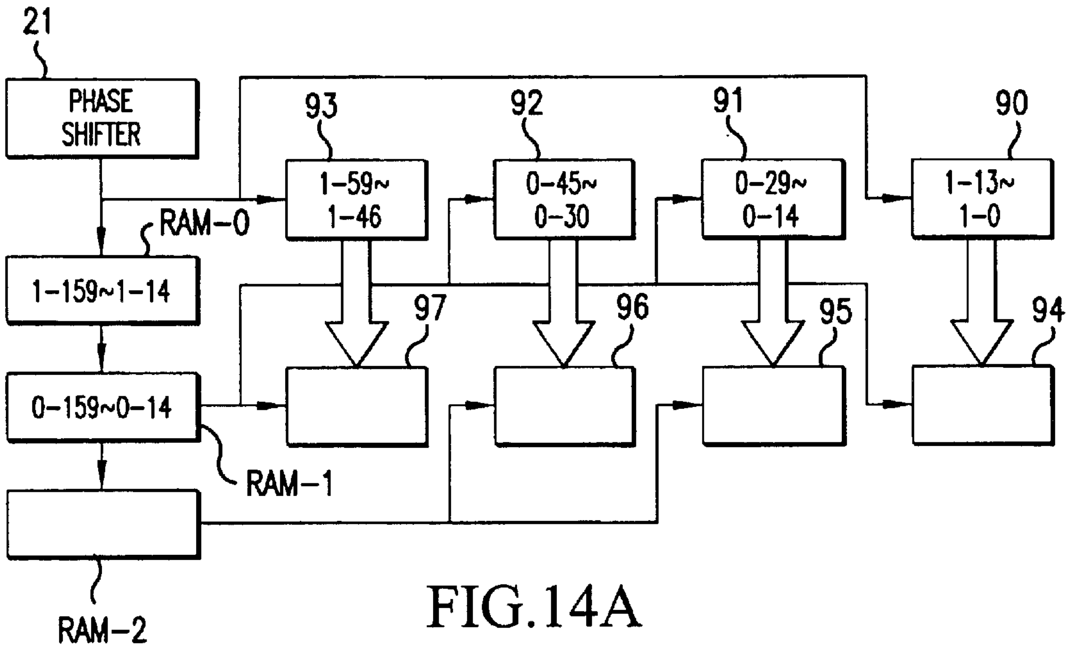
FIGS. 14A and 14B are diagrams for explaining the operation of the beamformer of FIG. 13.
Figure 14B:
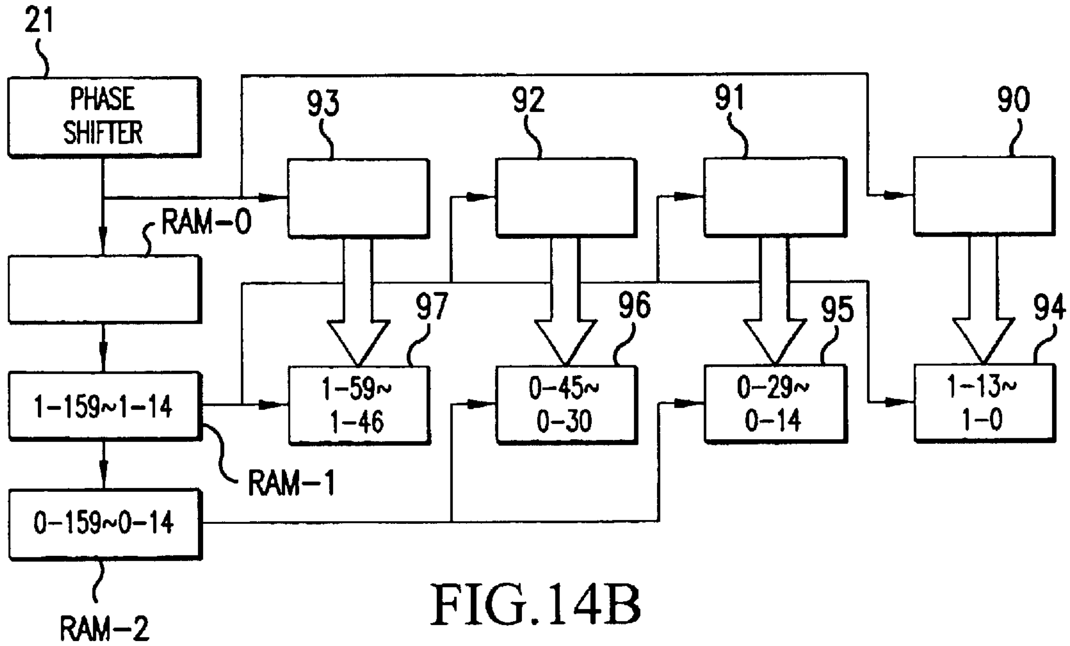

When the data have been entered as stated above (FIG. 14A), the data are loaded from the individual shift registers 90–93 to the parallel load shift registers 94–97 (FIG. 14B). After the data have been loaded to the parallel load shift registers 94–97, the data are delivered to the processing circuits 100–103, and a receiving beam is formed based on these data. In the example of FIG. 14B, a receiving beam numbered 0 (receiving beam 0) is formed. At this point, the data in the RAM-0 serving as a buffer are transferred to the RAM-1 for storing new scan data and the data previously stored in the RAM-1 is transferred to the RAM-2 for storing old scan data.

Figure 15A:
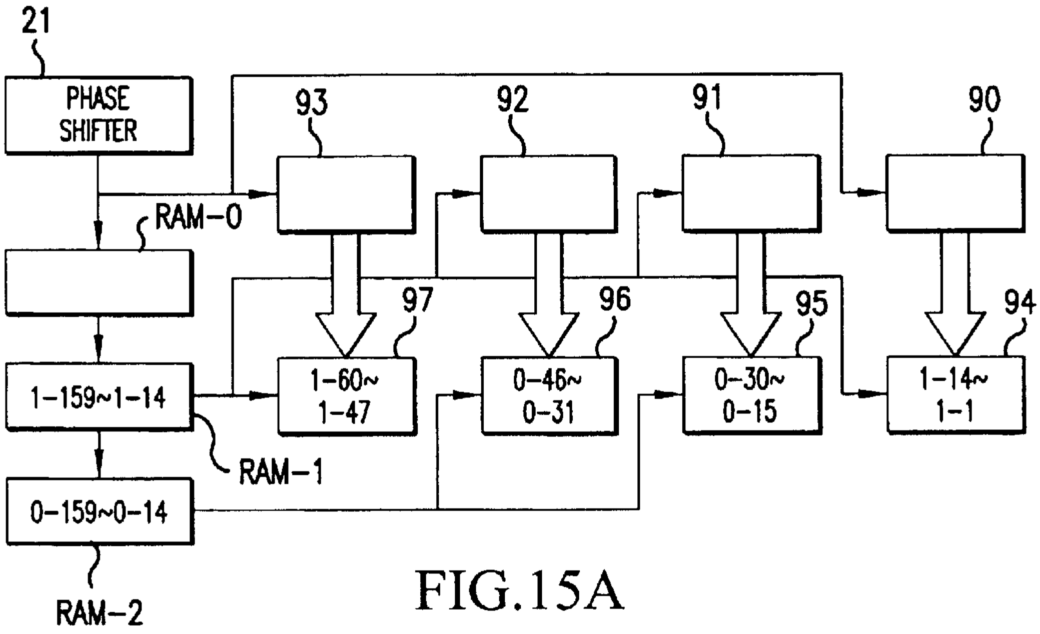
FIGS. 15A and 15B are diagrams for explaining the operation of the beamformer of FIG. 13.

Subsequently, the data in the individual parallel load shift registers 94–97 are shifted one by one, whereby receiving beams 1 to 100 are formed in succession. FIG. 15A is a diagram showing a state after the sample data have been shifted one stage forward from the state shown in FIG. 14A. The receiving beam 1 is formed from this data set.

Figure 15B:
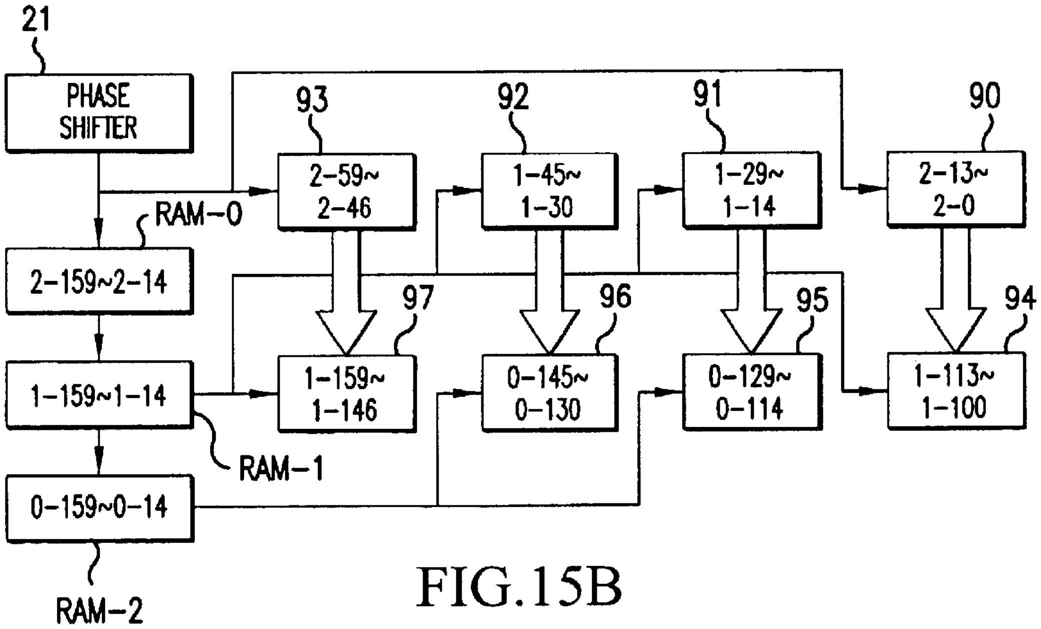
Figure 16:
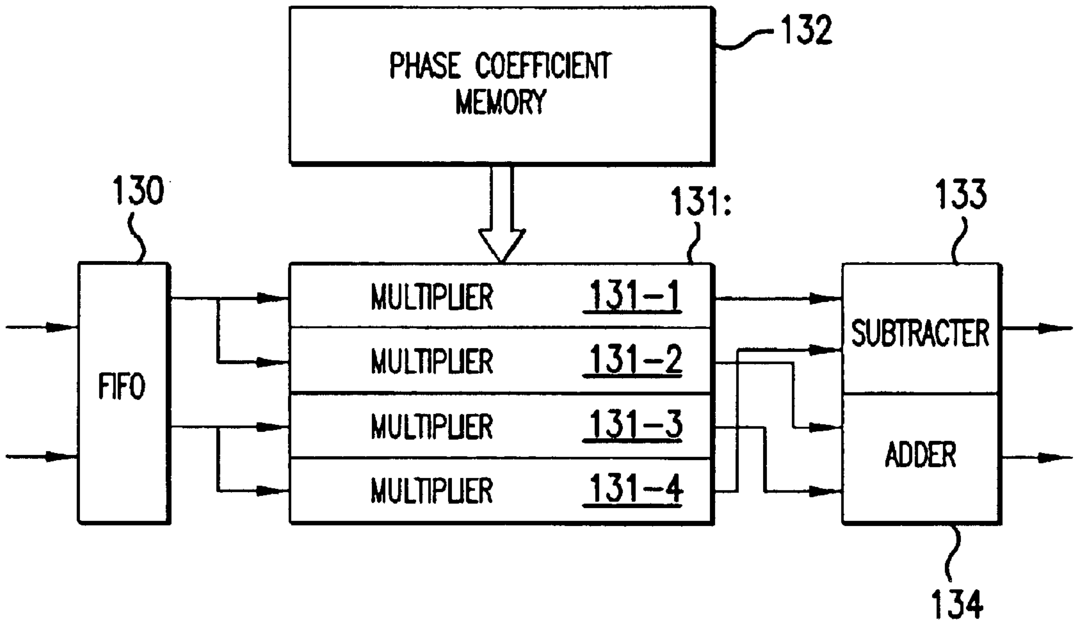
FIG. 16 is a diagram showing the configuration of a phase shifter of the processor unit.

The data are successively shifted in this fashion. When sample data 1–159 to 1–146 are set in the parallel load shift register 97, sample data 0–145 to 0–130 are set in the parallel load shift register 96, sample data 0–129 to 0–114 are set in the parallel load shift register 95, and sample data 1–113 to 1–100 are set in the parallel load shift register 94 as shown in FIG. 15B, the receiving beam 100 is formed from these data.

If the data are further shifted, a discontinuous data set is obtained and it is impossible to form a receiving beam. At this point, however, new data 2-*n* (n=0 to 159) obtained from the next scanning cycle have been entered to the RAM-0 and the 14-stage shift registers 90, 93 and the data 1–45 to 1–30 and 1–29 to 1–14 have been entered from the RAM-1 to the 16-stage shift registers 91, 92. These data constitute a data set to be used for forming the receiving beam 0 in a succeeding scanning cycle.

It is possible to form the receiving beam 0 for the succeeding scanning cycle by loading these data at the same time by the procedure shown in FIGS. 14A and 14B. Further, by re-executing the procedure shown in FIGS. 14A, 14B, 15A and 15B in this order, it is possible to load only a data set effective for beamforming, skipping a discontinuous data set.

To perform the dynamic focusing operation by which each receiving beam is sharply focused according to the distance, all coefficients set in the coefficient registers 104–107 are overwritten at the same time according to the time from the beginning of the beamforming operation, or according to the distance of each receiving beam.

Although it has been mentioned that the data are transferred from RAM-0 to RAM-1 and RAM-2 in this order in the foregoing discussion, the data are not actually transferred but write addresses and read addresses are altered to have the same effect.

Although the foregoing embodiment has been described with reference to the partially cutaway cylindrical transducer having a sectorial shape as shown in FIG. 8, the invention is applicable to a full-circle cylindrical transducer with transducer elements arranged all around its circumference.

Figure 17:
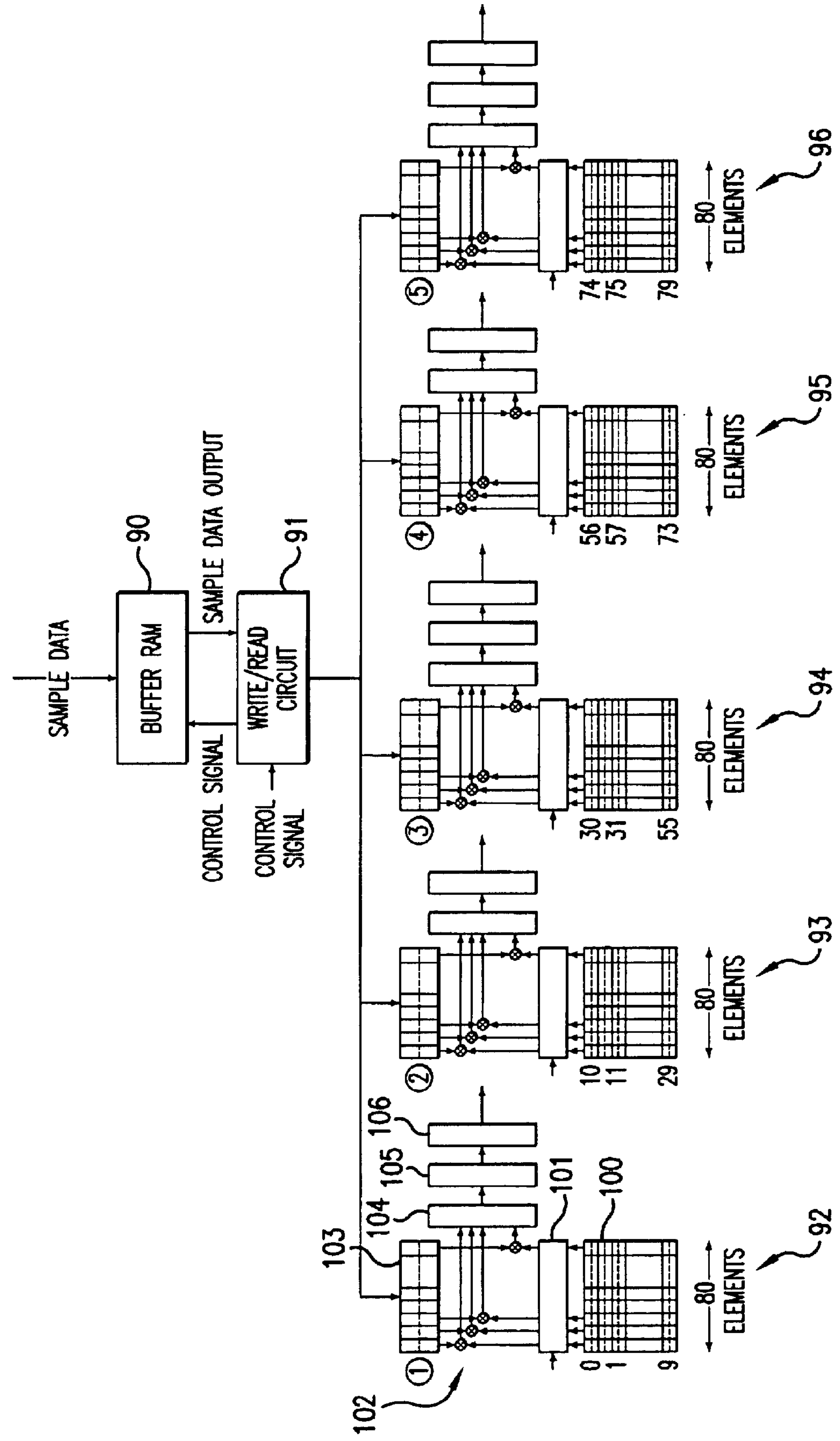
FIG. 17 is a diagram showing an example of a configuration of a beamformer employed when a linear array is used as a receiving ultrasonic transducer unit.

FIG. 17 is a diagram showing an example of a beamformer provided with matched filters which form receiving beams from data received by a linear array. This beamformer realizes the principle described with reference to FIG. 3. When a linear ultrasonic transducer array is used as a receiving transducer in the bottom detecting sonar of FIG. 6, the beamformer of FIG. 17 including these matched filters may be used as the beamformer 22 of FIG. 6.

Since steplike sample data as shown in FIG. 3 are directly used in this beamformer, the phase shifter 21 of FIG. 6 is not necessary. A phase shifter may be used, however, the sample data are entered after converting them into oblique equally-spaced sample data by shifting their phase.

In FIG. 17, a buffer RAM 90 is needed for producing sample data trains (1)–(5) and is formed of a dual-port RAM, for example. When the sample data trains are to be produced as shown in FIG. 3, sample data obtained in scanning cycle N+8 are written in the buffer RAM and data obtained in scanning cycles N−7 to N+7 are read out to produce data for the sample data trains (1)–(5). Therefore, the buffer RAM 90 should have a capacity to store sample data obtained in at least 16 scanning cycles (15 scanning cycles from scanning cycle N−7 to scanning cycle N+7, plus one scanning cycles N+8).

A read/write circuit 91 controls reading and writing of data to and from the buffer RAM 90 as well as data transfer to matched filter circuits 92–96. The matched filter circuits 92–96 correspond to the sample data trains (1)–(5), respectively, and form the receiving beams in beam directions (beam numbers) in a corresponding range. The sample data entered and coefficients of the matched filters are all complex-valued. Broken lines in a sample data section and a coefficient section indicate that the data are complex-valued data. Although the sample data section employs a double-buffer configuration in many cases to achieve high-speed processing, this is omitted in FIG. 17 for the sake of simplicity of explanation.

Now, the matched filter circuit 92 which processes the sample data train (1) used for forming the receiving beams 0 to 9 is described. A coefficient memory 100 stores match data (filter coefficients) for forming the receiving beams 0 to 9. A coefficient select circuit 101 reads out a filter coefficient from the coefficient memory 100 according to an externally entered beam number and delivers the filter coefficient to a multiplier group 102. A sample data register 103 stores data obtained from the elements 0–79 in a specific scanning cycle entered from the read/write circuit 91. These sample data are the sample data of the sample data train (1) shown in FIG. 3. The sample data register 103 delivers these data to the multiplier group 102. The multiplier group 102 multiplies the input sample data by the filter coefficient and delivers the results to an adder 104. The adder 104 adds the results of multiplication given by individual multipliers and calculates the sum of their in-phase portion and the sum of their quadrature portion. Using these sums, an amplitude detecting circuit 105 calculates amplitude by performing an operation expressed by $(I^2+Q^2)^{1/2}$. This amplitude value is delayed by a time period equivalent to two times the wavelength by a delay circuit 106 and outputted as a receiving amplitude output in the direction of the beam of the specified beam number.

If the above-described operation is performed on the sample data trains (2) to (5) separately for individual sets of beam numbers, amplitude outputs for the receiving beams 0 to 79 are obtained. If the match data are made continuously variable during the beamforming operation, it is possible to perform dynamic focusing operation in this beamformer as well.

The matched filter circuits 92, 94 and 96 are provided with 2λ delay circuits for delaying the sample data trains (1), (3) and (5) by the time period equivalent to two times the wavelength. These 2λ delay circuits are needed because the sample data trains (1), (3) and (5) are advanced by as much as two times the wavelength compared to the sample data trains (2) and (4) in the example of FIG. 3. This is because the number of steps of a sample data train is an even number (8 steps) and the midpoint of the sample data train lies between two steps as shown in FIG. 3, causing the midpoint of the sample data train to deviate by as much as two times the wavelength.

It is possible to advance data entered into the sample data trains (2) and (4) by as much as one scanning cycle (four times the wavelength) by the read/write circuit 91. In this case, a 2λ delay is inserted in the sample data trains (2) and (4). If the number of steps of each oblique steplike sample data train is an odd number, the midpoint of all the sample data trains can be set in the same scanning cycle, so that the 2λ delay circuits are not necessary.

Figure 18:
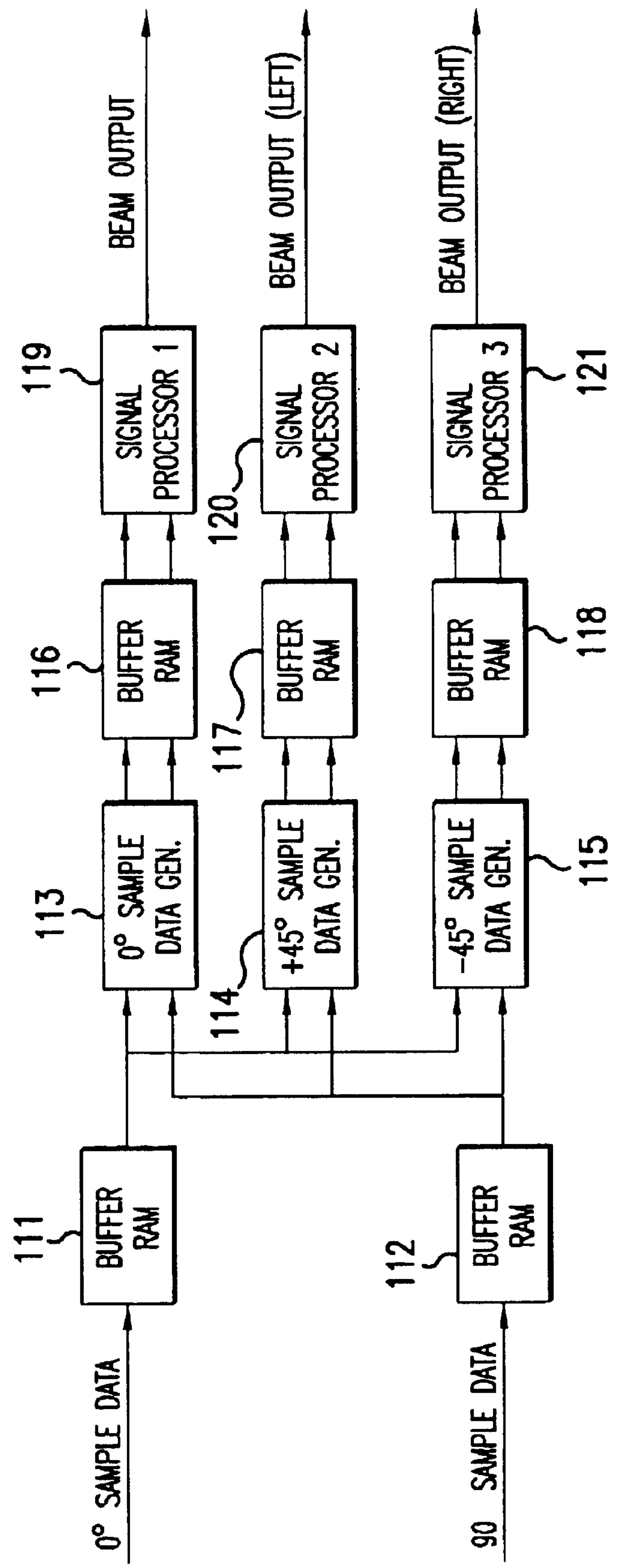
FIG. 18 is a diagram showing an example of a beamformer whose beam width is increased by DFT operation using a linear array as a receiving transducer.
Figure 19:
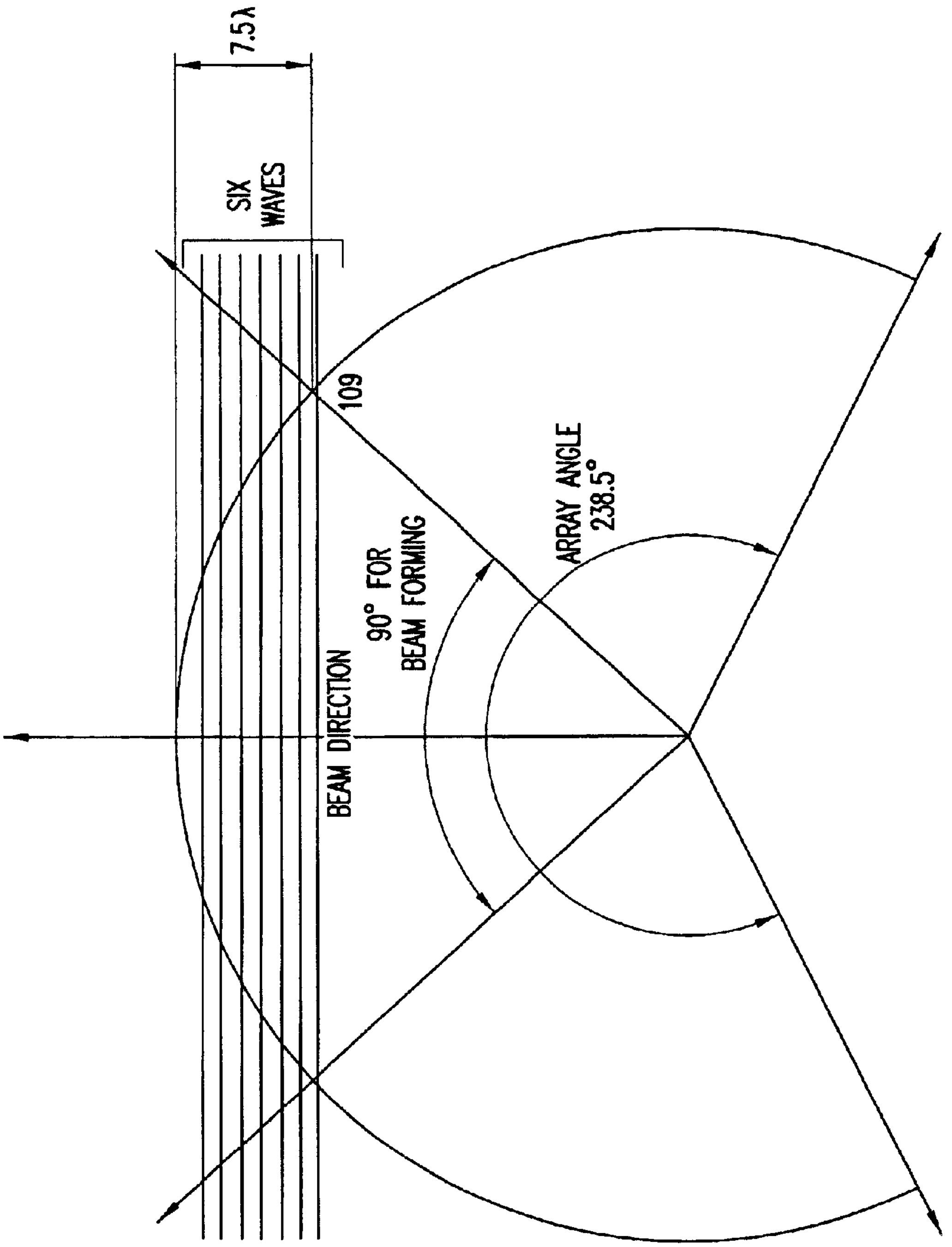
FIG. 19 is a diagram depicting a cause of deterioration of a beam formed by a cylindrical array.
Figure 20:
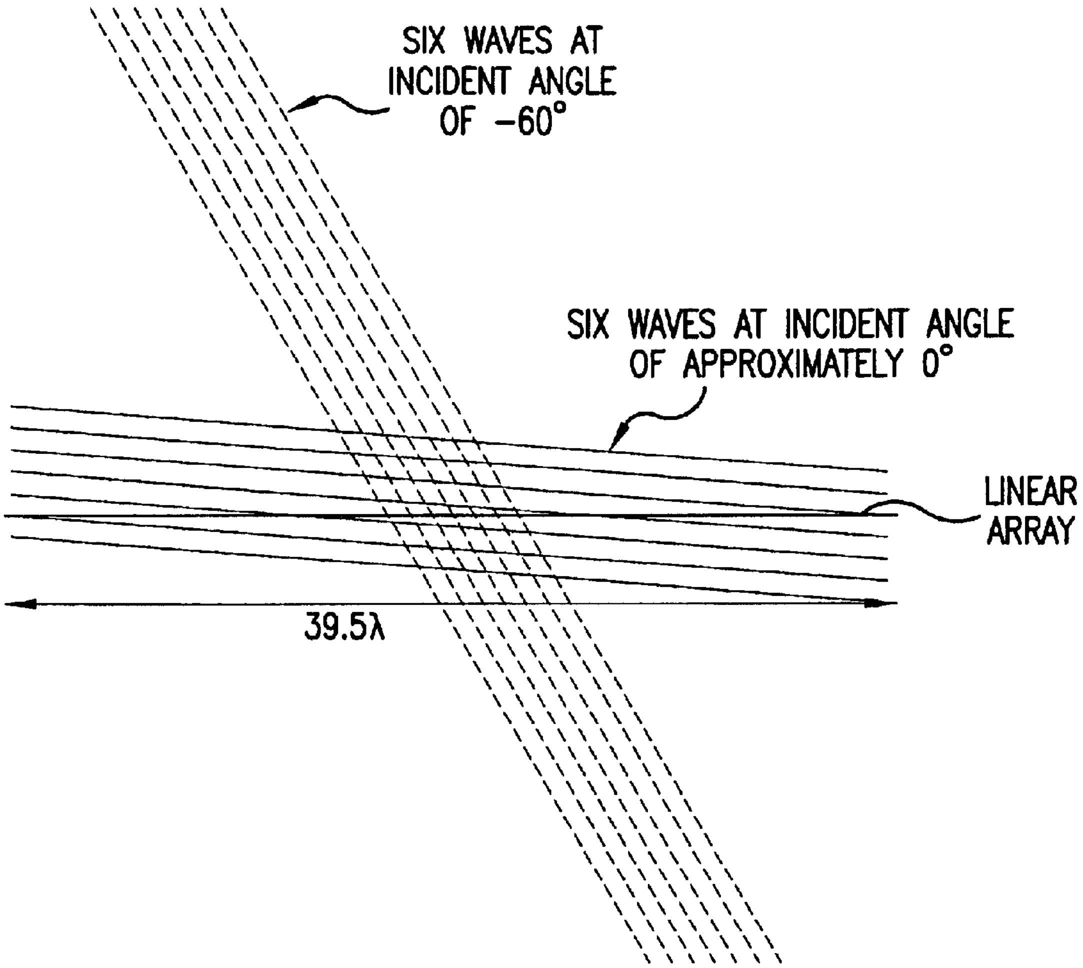
FIG. 20 is a diagram depicting a cause of deterioration of a beam formed by a linear array.

FIG. 18 is a block diagram of a processor unit which forms receiving beams by DFT operation after altering a sampling plane of data received by a linear array by delay and phase-shifting operations. This processor unit realizes the principle described with reference to FIG. 5. In a case where a linear ultrasonic transducer array is used as a receiving transducer in the bottom detecting sonar of FIG. 6 and receiving beams are formed without using matched filters, this processor unit can be used as the processor unit 3 of FIG. 6. In this case, later-described 0° sample data generating circuit 113, +45° sample data generating circuit 114 and −45° sample data generating circuit 115 correspond to the phase shifter 21, and DFT circuits 119–121 correspond to the beamformer 22.

Referring to FIG. 18, buffer RAMs 111 and 112 buffer the 0° sample data and 90° sample data entered from the transceiver unit 2, respectively. These sample data may be any form of time series data, such as the oblique steplike sample data shown in FIG. 2, simultaneously sampled data shown in FIG. 8 or oblique continuous sample data. The buffer RAMs 111, 112 may be ordinary SRAMs or dual-port SRAMS, for example. The buffer RAMs 111, 112 have memory areas to store data obtained from 11 scanning cycles (N−5 to N+5) to create sampling planes with angles of inclination 0°, +45° and −45° for the linear array as shown in FIG. 5. In other words, 10 sample data trains obtained from the scanning cycles N−5 to N+4 are used to form a sampling plane with the angle of inclination 0°, +45° or −45°, and the sample data entered is written in the memory area for the scanning cycle N+5.

The 0° sample data generating circuit 113 reads the sample data train obtained from the scanning cycle N and stored in the buffer RAMs 111, 112. If this sample data train is made of oblique steplike sample data or oblique continuous sample data, the 0° sample data generating circuit 113 shifts the phase of the individual sample data to convert them into a sample data train which would be obtained by simultaneous sampling and writes this sample data train in a buffer RAM 117. If the sample data train stored in the buffer RAMs 111, 112 is made of simultaneously sampled data, the sample data train is output as it is and written in the buffer RAM 117.

The −45° sample data generating circuit 115 reads the sample data trains obtained from the scanning cycles N−5 to N+4 and stored in the buffer RAMs 111, 112. In this process, the −45° sample data generating circuit 115 needs to read only the sample data trains shown by a thick line in FIG. 5 among the individual scanning cycles. Then, the −45° sample data generating circuit 115 obliquely shifts the phase of the sample data train of each scanning cycle and generates continuous sample data of the −45° sampling plane as shown in FIG. 5 by connecting all the sample data trains in a continuous line. In other words, the −45° sample data generating circuit 115 generates a sample data train as if it has been obtained by the linear array oriented in the −45° direction, and writes this sample data train in a buffer RAM 118. Regardless of whether the sample data trains entered from the buffer RAMs 111, 112 are oblique steplike sample data, simultaneously sampled data or oblique continuous sample data, delay and phase-shifting coefficients for correcting sampling timing may be used.

The +45° sample data generating circuit 114 reads the sample data trains obtained from the scanning cycles N−5 to N+4 and stored in the buffer RAMs 111, 112 in an opposite direction to the aforementioned −45° sample data generating circuit 115, and generates continuous sample data of the +45° sampling plane as shown in FIG. 5. Then, the +45° sample data generating circuit 114 writes this sample data train in the buffer RAM 117.

Although the sample data obtained from the scanning cycle N are used between the scanning cycle N and scanning cycle N+1, for instance, in the above example, this arrangement may be modified such that the data obtained from the scanning cycle N are used in an region closer to the timing of the scanning cycle N than the midpoint, and the data obtained from the scanning cycle N+1 are used in an region closer to the timing of the scanning cycle N+1 than the midpoint. Furthermore, a region between the scanning cycle N and scanning cycle N+1 may be interpolated by using the sample data of the scanning cycle N and the sample data of the scanning cycle N+1.

The DFT circuit 119 performs the DFT operation on the sample data train of the 0° sampling plane and forms receiving beams oriented around the 0° direction (center). The DFT circuit 120 performs the DFT operation on the sample data train of the +45° sampling plane and forms receiving beams oriented around the +45° direction (left side). The DFT circuit 121 performs the DFT operation on the sample data train of the −45° sampling plane and forms receiving beams oriented around the −45° direction (right side). The receiving beam can be steered in all directions by combining the receiving beams formed by the DFT circuits 119–121.

While the foregoing embodiment has been described as having the three DFT circuits 119–121 to make it easier to understand the operation of the individual circuit elements, the DFT circuits 119–121 may be combined into a single processing circuit if it has a sufficient processing capability by use of a high-speed digital signal processor (DSP), for example.

Furthermore, although three different angles 0°, +45° and −45° are used for generating the sample data trains to simplify the description of the foregoing embodiment, the number of sample data trains to be produced and their angles may be optimized according to the beamwidth and minimum pulsewidth of echo signals.

Figure 21:
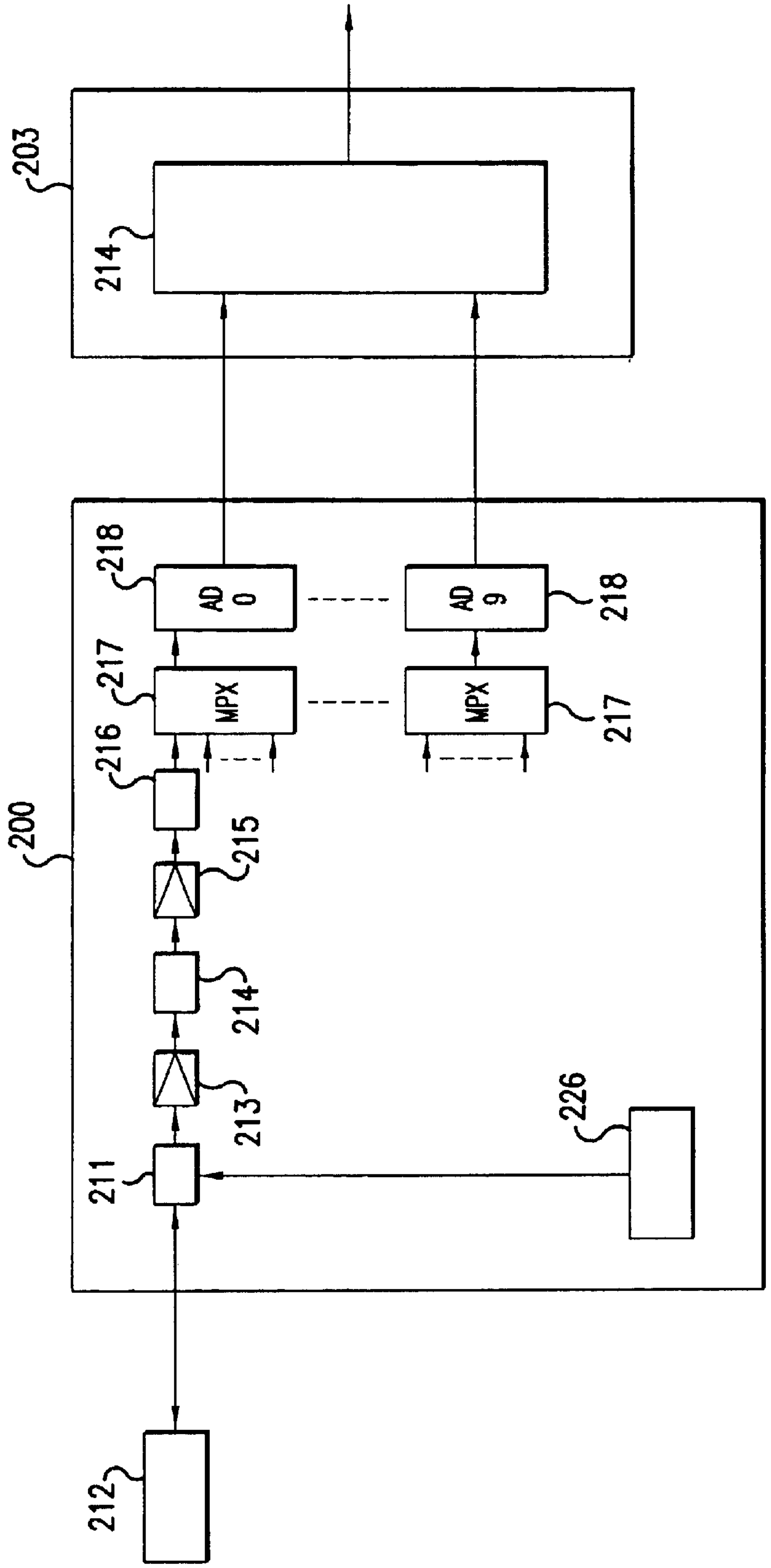
FIG. 21 is a block diagram of an embodiment of a scanning sonar according to the invention.

Referring to FIG. 21, another embodiment according to the invention will be explained hereinafter. The invention is embodied a general type of scanning sonar.

The transmission circuit 226 supplies a search pulse signal having a carrier frequency of, for example, 200 KHz through a T/R switch 211 to a transducer unit 212. The transducer unit 212 comprises 160 transducer elements placed at equal intervals on an imaginary circle. Echo signals received by the transducer elements advance through the T/R switch 211, a preamplifier 213, a filter 214, a TVG amplifier 215 and a filter 216 to ten corresponding multiplexers 217. The multiplexers 217 multiplex the input signals from the 160 transducer elements to ten channels to supply the output signals to the ten A/D converters (AD0 through AD9) respectively. The output signals of the ten A/D converters AD0 through AD9 are supplied to the processor unit 203 comprising a beam former 214. The output signals of the beamformer 214 are supplied to an indicator for display.

The ten multiplexers 217 and A/D converters AD0 through AD9 multiplex and sample the input signals in the same way, for example, as shown in FIG. 9. The beamformer 214 shifts in phase the input signals by desired amounts and forms receiving beams in accordance with the above-described equation (1) and the equation $(I^2+Q^2)^{1/2}$. The beamformer 214 performs phase-shifting and beam-forming operations at the same time.

Although the data of the 160 channels are multiplexed and sampled as shown in FIG. 9, it is also possible to employ another method of multiplexing and sampling the signals. With the arrangement of the 160 transducer elements, ten multiplexers and ten A/D converters being the same as the foregoing embodiment, the A/D converter AD0, for example, samples the data from the transducer elements 0 through 15 in an order of 0, 1, 2, 3, 0, 1, 2, 3, 0, 1, 2, 3, 0, 1, 2, 3, 4, 5, 6, 7, 4, 5, 6, 7, . . . 12, 13, 14, 15, 12, 13, 14, 15, 12, 13, 14, 15 and 12, 13, 14, 15. The A/D converter AD1 samples the data from the transducer elements 16 through 31 in an order of 16, 17, 18, 19, 16, 17, 18, 19, 16, 17, 18, 19, 16, 17, 18, 19, . . . 28, 29, 30, 31, 28, 29, 30, 31, 28, 29, 30, 31, and 28, 29, 30, 31. Likewise, the other A/D converters AD2 through AD9 sample data from corresponding transducer elements respectively.

Although the data of the 160 channels are multiplexed by using 10 lines of the multiplexers 217 and the A/D converters 219 and repeatedly sampled at 4λ time intervals as shown in FIG. 9. In the foregoing embodiment, the data may be multiplexed into 8 lines and sampled at 3.5λ time intervals. Alternatively, the data may be multiplexed into 10 lines and sampled at 4.5λ time intervals.

Figure 22:
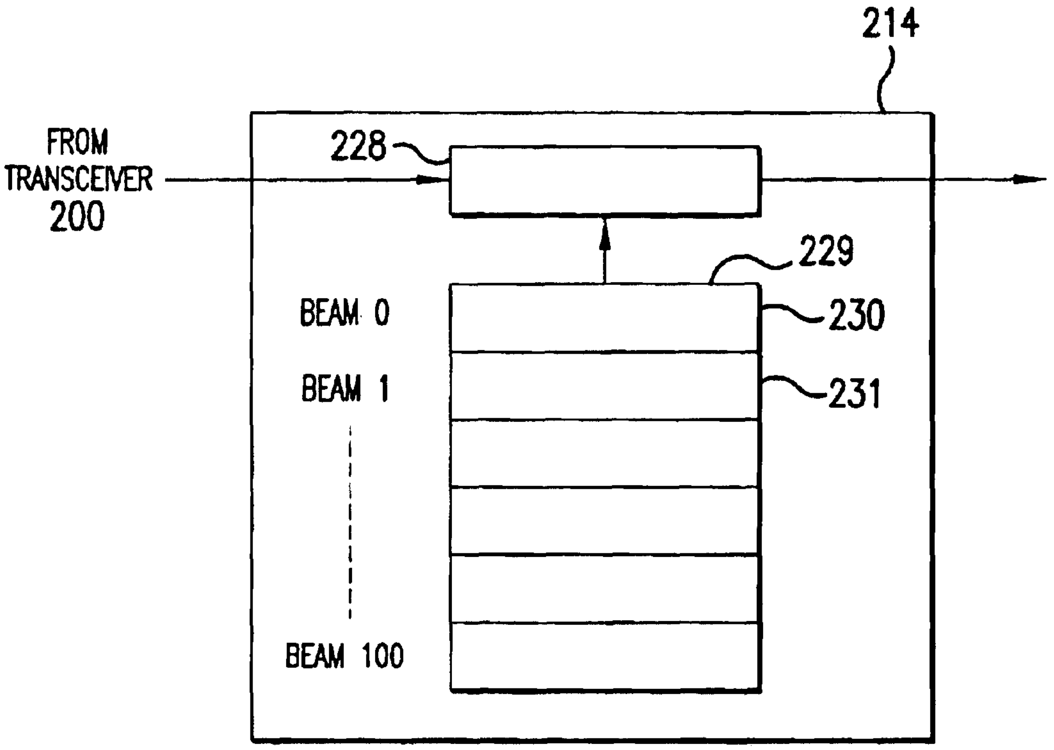
FIG. 22 is a diagram showing the construction of a beamformer used in FIG. 21.

FIG. 22 shows the construction of the beamformer 214. The beamformer 214 is constructed of a complex matched filter. It comprises a signal processor 228 and a memory 229. A memory section 230 of the memory 229 stores complex coefficients for forming a reception beam 0. A memory section 231 stores complex coefficients for forming a beam 1. In the same way, other memory sections store corresponding complex coefficients for forming reception beams 2 through 100. The 0° sample data (in-phase) and the 90° sample data (quadrature) are supplied to the signal processor 228 of the beamformer 214 from the transceiver unit 200. While, the complex coefficients respectively corresponding to reception beams are supplied to the signal processor. The beamformer 214 first performs the calculation on the complex sample data supplied from, for example, sixty transducer elements through the transceiver unit 200 in accordance with the equation (1) above. Then, the amplitude signals are obtained based on the resultant signals in accordance with the equation $(I^2+Q^2)^{1/2}$. The signal processor 228 forms a reception beam 0 based on echo signals caught by sixty transducer elements and corresponding complex coefficients having been stored in the memory section 230. In the same way, the signal processor 228 form reception beams 1 through 100 successively and repeatedly. The way to form a reception beam is performed, for example, as shown in FIG. 11.

Figure 23:
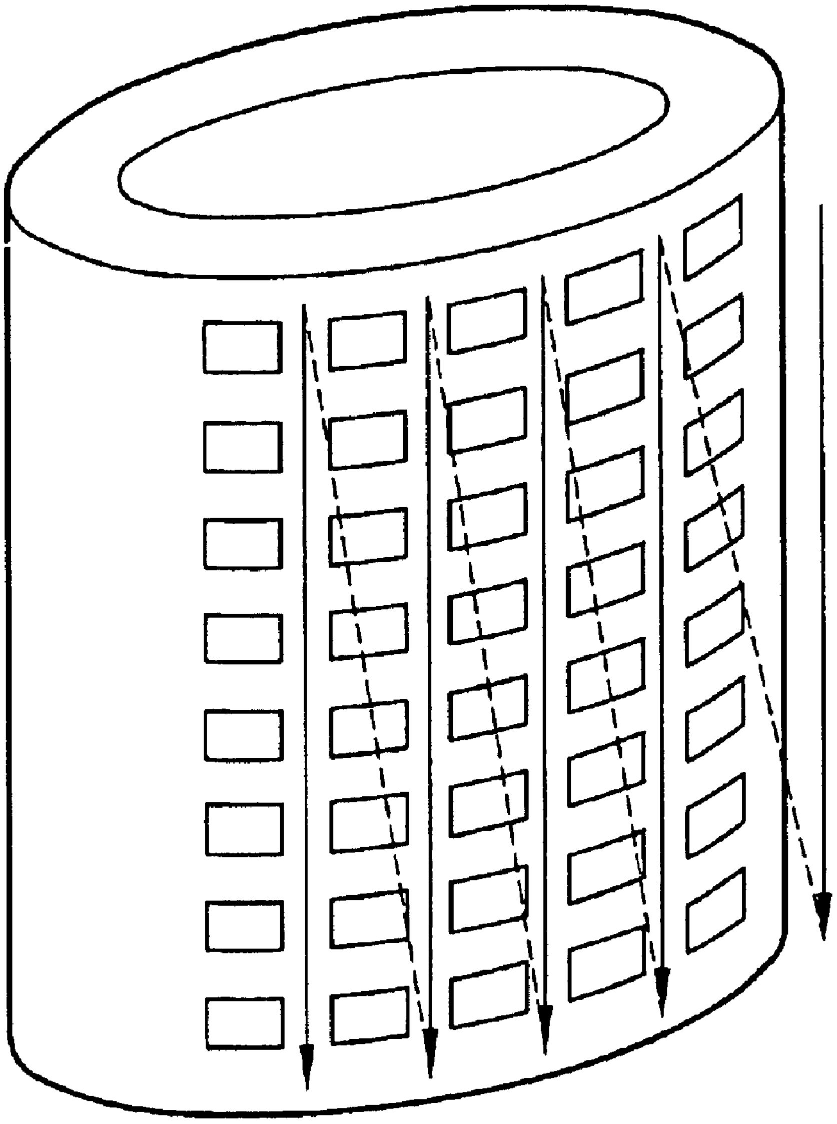
FIG. 23 is an example of a transducer unit used in the scanning sonar shown in FIG. 21.

FIG. 23 shows a transducer unit for emitting and receiving ultrasonic signals, which is used in a scanning sonar of a general type. Although 160 transducer elements are arranged on a circle at constant intervals in the foregoing embodiment, the transducer elements can be arranged on the surface of a cylinder at intervals in rows and columns respectively. Echo signals caught by the transducer elements are derived in the order indicated by arrows and are supplied to the beamformer 214 through the transceiver unit 200.

Figure 24:
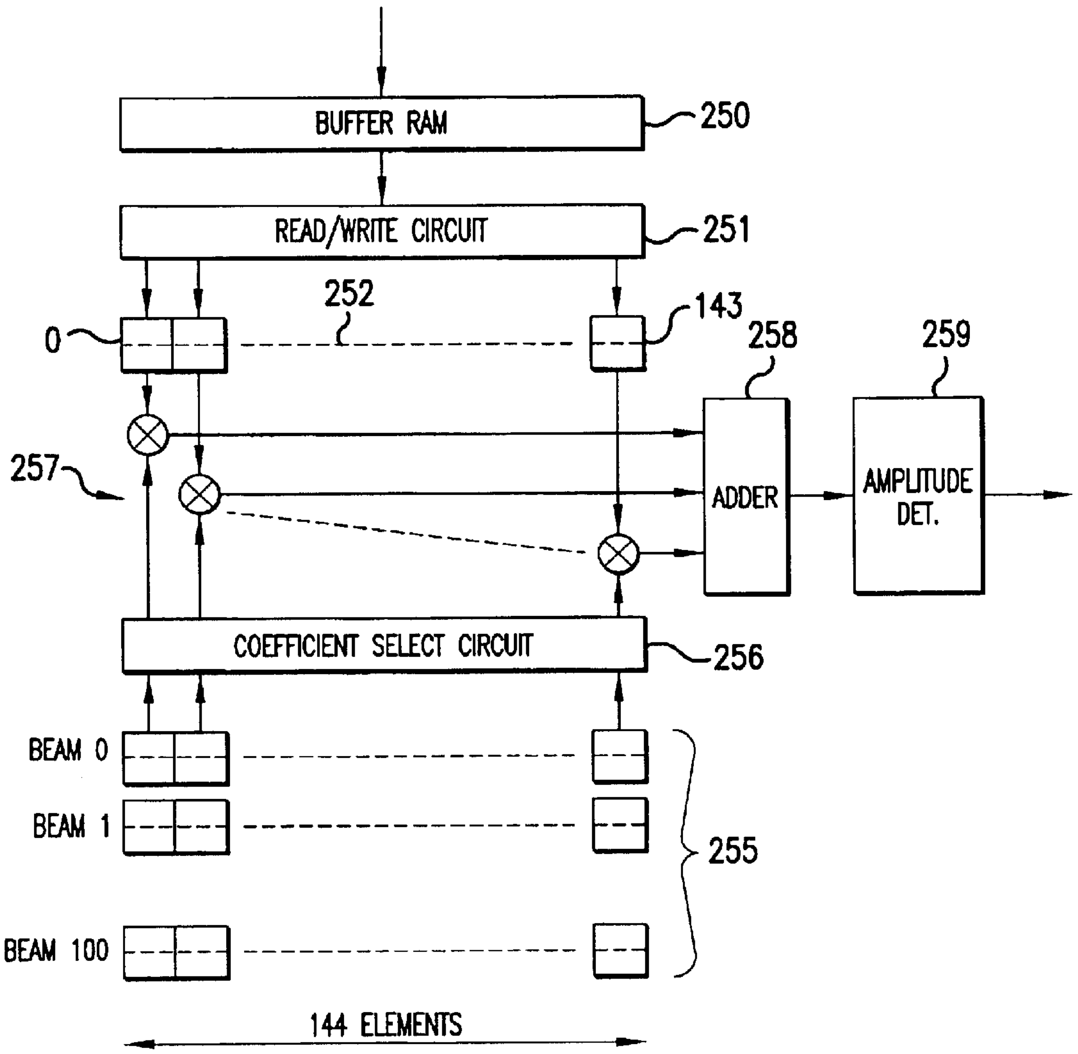
FIG. 24 is a block diagram of a beamformer used in scanning sonar shown in FIG. 21.

FIG. 24 shows an embodiment of the beamformer according to the present invention. With this embodiment, 480 transducer elements are arranged on a plane, for example, on the surface of a cylinder as shown in FIG. 23 and 30 reception beams are formed successively and horizonatlly. The beamformer is comprised with a buffer RAM 250, a read/write circuit 251 and a matched filter circuit. The matched filter circuit is comprised with a sample data register 252, a coefficient memory 255 having thirty rows corresponding to thirty reception beams formed, a coefficient select circuit 256, a multiplier group 257, an adder 258 and an amplitude detecting circuit 259.

The buffer RAM 250 is supplied with complex-valued sample data of in-phase and quadrature signals from the transceiver unit 200, which are stored therein. A read/write circuit 251 controls reading and writing of data to and from the buffer RAM 250 as well as data transfer to the matched filter circuit. The coefficient memory 255 stores match data (filter coefficients) for forming the receiving beams 0 through 29. The coefficient select circuit 256 reads out a filter coefficient from the coefficient memory 255 successively for forming reception beams 0 through 29 and delivers the filter coefficient to the multiplier group 257. The sample data register 252 stores data obtained from the elements 0–143 entered from the read/write circuit 251. The sample data register 252 delivers these data to the multiplier group 257. The multipliers of the group 257 multiplies the input sample data by the filter coefficients respectively and deliver the results to the adder 258. The adder 258 adds the results of multiplication given by individual multipliers and calculates the sum of their in-phase portion and the sum of their quadrature portion. Using these sums, the amplitude detecting circuit 259 calculates amplitude by performing an operation expressed by $(I^2+Q^2)^{1/2}$ to produce echo signals received by the reception beam thus formed. In the same way, the other reception beams 1 through 29 are successively formed.

In the case in which a transducer unit of a cylinder type is used having many transducer elements, for example, 480 elements arranged in rows and columns as in the foregoing, the same complex coefficients are used for forming each of the reception beams. There are cases which require different complex coefficients for forming reception beams. For example, if transducer elements are arranged at unequal intervals on a curved plane such as on the surface of a sphere, different complex coefficients are required to form reception beams, with each beam formed by using the same number of the transducer elements thereon.

While the invention has been described in detail and with reference to specific embodiments thereof, it will be apparent to one skilled in the art that various changes and modifications can be made therein without departing from the spirit and the scope of invention.

What is claimed is:

1. A matched filter which selects an arc-shaped part of ultrasonic transducer elements from a plurality of ultrasonic transducer elements arranged in a circular form and forms a receiving beam oriented in a central direction of said arc-shaped part, said matched filter comprising:

a shift register which has as many stages as a number given by (the number of said ultrasonic transducer elements arranged in the circular form)×(n−1)+(the number of said ultrasonic transducer elements of the arc-shaped part), where n is an integer, and stores signal trains obtained from said ultrasonic transducer elements of the arc-shaped part among signal trains of multiple scanning cycles sequentially entered from said ultrasonic transducer elements arranged in the circular form in the order of a signal train of the nth scanning cycle, a signal train of the (n−1)th scanning cycle, . . . , a signal train of the second scanning cycle and a signal train of the first scanning cycle;

a plurality of multipliers which divide said ultrasonic transducer elements of the arc-shaped part into n blocks according to the direction in which the receiving beam is formed, selects signals of the ultrasonic transducer elements of a block closest to the beam direction from the signal train of the nth scanning cycle, selects signals of the ultrasonic transducer element of a block next to the block closest to the beam direction from the signal train of the (n−1)th scanning cycle, . . . , selects signals of the ultrasonic transducer elements of a block next to block most distant from the beam direction from the signal train of the second scanning cycle, selects signals of the ultrasonic transducer elements of the block most distant from the beam direction from the signal train of the first scanning cycle, and multiplies the individual signals by corresponding coefficients; and an adder which adds up results of multiplications performed by the individual multipliers and outputs the sum as correlation data.

2. A matched filter which selects an arc-shaped part of ultrasonic transducer elements from multiple ultrasonic transducer elements arranged in a partially cutaway circular form and forms a receiving beam oriented in a central direction of said arc-shaped part, wherein n number of shift registers having as many stages as the number of said multiple ultrasonic transducer elements arranged in the partially cutaway circular form and shift registers having as many stages as the number of said ultrasonic transducer elements of the arc-shaped part are connected in parallel, and said matched filter stores signal trains obtained from said ultrasonic transducer elements of the arc-shaped part among signal trains of multiple scanning cycles sequentially entered from said ultrasonic transducer elements arranged in the partially cutaway circular form in the order of a signal train of the nth scanning cycle, a signal train of the (n−1)th scanning cycle, . . . , a signal rain of the second scanning cycle and a signal train of the first scanning cycle while loading them in parallel between the individual shift registers, said matched filter comprising:

a plurality of multipliers which divide said ultrasonic transducer elements of the arc-shaped part into n blocks according to the direction in which the receiving beam is formed, selects signals of the ultrasonic transducer elements of a block closest to the beam direction from the signal train of the nth scanning cycle, selects signals of the ultrasonic transducer element of a block next to the block closest to the beam direction from the signal train of the (n−1)th scanning cycle, . . . , selects signals of the ultrasonic transducer elements of a block next to block most distant from the beam direction from the signal train from the second scanning cycle, selects signals of the ultrasonic transducer elements of the block most distant from the beam direction from the signal train of the first scanning cycle, and multiplies the individual signals by corresponding coefficients; an an adder which adds up results of multiplications performed by the individual multipliers and outputs the sum as correlation data.

3. The matched filter according to claim 1, wherein the signal trains entered from said multiple ultrasonic transducer elements are complex-valued sample data trains, and wherein said matched filter comprises:

two lines of said shift registers for the in-phase data and quadrature data;

four lines of said multipliers and said adder for in-phase data×in-phase coefficient, quadrature data×quadrature coefficient, in-phase data×quadrature coefficient, and quadrature data×in-phase coefficient; and an output section which determines an in-phase portion of a correlation value by subtracting the product of in-phase data×in-phase coefficient from the product of quadrature data×quadrature coefficient, and determines a quadrature portion of the correlation value by adding the products of in-phase data quadrature coefficient and the product of quadrature data x in-phase coefficient.

4. The matched filter according to claim 1, wherein multiple sets of the coefficients are provided such that the receiving beam can be focused at varying distances.

5. A receiving beam-forming apparatus in which echo signals received by multiple ultrasonic transducer elements arranged in a linear form are sampled at a specific scanning frequency to obtain sample data, said receiving beam-forming apparatus comprising:

a memory which stores the sample data derived from multiple scanning cycles; and a beamformer which divides the multiple ultrasonic transducer elements into multiple blocks, reads out the sample data derived from different scanning cycles for the individual blocks from said memory, and forms a receiving beam in a specific direction using the individual sample data which have been read out.

6. The receiving beam-forming apparatus according to claim 5, wherein selection of the scanning cycles for the individual blocks is altered according to the angle between the direction of the receiving beam and the ultrasonic transducer elements arranged in the linear form.

7. The receiving beam-forming apparatus according to claim 5, wherein said beamformer is a matched filter which forms the receiving beam in the specific direction by multiplying the individual sample data by specific coefficients, and said matched filter is provided with multiple sets of the coefficients so that the receiving beam can be focused at varying distances.

8. A sonar system which emits an ultrasonic search pulse signal and receives echo signals by receiving beams formed successively and oriented in successively varying directions, said sonar system comprising:

a plurality of transducer elements for receiving echo signals of a specific frequency;

a plurality of A/D converters which convert analog signals supplied from said transducer elements into digital form;

means for generating in-phase data of complex-valued sample data and quadrature data of complex-valued sample data from the digital signals; and a matched filter for receiving the in-phase data of complex-valued sample data and quadrature data of complex-valued sample data from said generating means and successively forming the receiving beams in different directions.

9. The sonar system as claimed in claim 8, wherein the matched filter comprises a first memory unit for storing complex valued sample data resulting from echo signals, a second memory unit for storing complex coefficients, a plurality of multipliers for multiplying the sample data with the corresponding complex coefficients respectively, an adder for adding the output signals from the multipliers, and an amplitude detector for producing based on the output signals of the adder a output signals forming a reception beam.

10. The sonar system s claimed in claim 8, wherein the plurality of transducer elements are arranged on the surface of a sphere at space intervals.

11. A sonar system which emits an ultrasonic search pulse signal and receives echo signals by receiving beams formed successively and oriented in successively varying directions, said sonar system comprising:

a plurality of groups of transducer elements for receiving echo signals of a specific frequency;

a plurality of multiplexers which multiplex signals entered successively from each of said groups of the transducer elements into a smaller number of channels than the number of said transducer elements, wherein said multiplexers operate with synchronized switching timing;

a plurality of A/D converters which convert analog signals entered respectively and individually from said multiplexers into digital form, wherein said A/D converters operate with synchronized sampling timing;

means for generating in-phase data of complex-valued sample data and quadrature data of complex-valued sample data from the digital signals; and a matched filter for receiving the in-phase data of complex-valued sample data and quadrature data of complex-valued sample data from said generating means and successively forming the receiving beams in different directions, the matched filter comprising a first memory unit for storing complex valued sample data resulting from echo signals, a second memory unit for storing complex coefficients, a plurality of multipliers for multiplying the sample data with the corresponding complex coefficients respectively, an adder for adding the output signals from the multipliers, and an amplitude detector for producing based on the output signals of the adder output signals forming a reception beam.

12. The sonar system as claimed in claim 11, wherein the plurality of the transducer elements are arranged on the surface of a sphere at space intervals.

* * * * *